US010831547B2

(12) United States Patent
Suzuki et al.

(10) Patent No.: US 10,831,547 B2
(45) Date of Patent: Nov. 10, 2020

(54) ACCELERATOR CONTROL APPARATUS FOR ANALYZING BIG DATA, ACCELERATOR CONTROL METHOD, AND PROGRAM

(71) Applicant: NEC CORPORATION, Tokyo (JP)

(72) Inventors: Jun Suzuki, Tokyo (JP); Masaki Kan, Tokyo (JP); Yuki Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 166 days.

(21) Appl. No.: 16/070,312

(22) PCT Filed: Jan. 27, 2017

(86) PCT No.: PCT/JP2017/003028
§ 371 (c)(1),
(2) Date: Jul. 16, 2018

(87) PCT Pub. No.: WO2017/131187
PCT Pub. Date: Aug. 3, 2017

(65) Prior Publication Data
US 2019/0026157 A1 Jan. 24, 2019

(30) Foreign Application Priority Data
Jan. 29, 2016 (JP) .................. 2016-015352

(51) Int. Cl.
*G06F 9/46* (2006.01)
*G06F 9/50* (2006.01)
(Continued)

(52) U.S. Cl.
CPC .......... *G06F 9/5038* (2013.01); *G06F 3/0604* (2013.01); *G06F 3/0659* (2013.01);
(Continued)

(58) Field of Classification Search
None
See application file for complete search history.

(56) References Cited

U.S. PATENT DOCUMENTS

2006/0112388 A1  5/2006  Taniguchi et al.
2008/0168465 A1  7/2008  Tanaka

FOREIGN PATENT DOCUMENTS

JP    2008-152470 A    7/2008
JP    2013-025392 A    2/2013
WO    2011/078162 A1   6/2011

OTHER PUBLICATIONS

International Search Report of PCT/JP2017/003028 filed Apr. 25, 2017.

*Primary Examiner* — Gregory A Kessler
(74) *Attorney, Agent, or Firm* — Sughrue Mion, PLLC

(57) ABSTRACT

An accelerator control apparatus includes: a task storage part which holds an executable task(s); a data scheduler which selects a task needing a relatively small input/output data amount on a memory included in an accelerator when the task is executed by the accelerator from the executable task(s) and instructs the accelerator to prepare for data I/O on the memory for the selected task; and a task scheduler which instructs the accelerator to execute the selected task and adds a task that becomes executable upon completion of the selected task to the task storage part, wherein the data scheduler continues, depending on a use status of the memory, selection of a next task from the executable task(s) held in the task storage part and preparation of data I/O for the next task selected.

15 Claims, 22 Drawing Sheets

(51) Int. Cl.
  *G06F 3/06* (2006.01)
  *G06F 9/38* (2018.01)
  *G06F 9/48* (2006.01)
(52) U.S. Cl.
  CPC .......... *G06F 3/0671* (2013.01); *G06F 9/3877* (2013.01); *G06F 9/4881* (2013.01); *G06F 9/5016* (2013.01)

FIG. 9

| RESERVATION API | • map(α, β, ...)<br>• mapLoop(α, β, ...)<br>... |
|---|---|
| EXECUTION API | • storeObject(α, β, ...)<br>• appendObject(α, β, ...)<br>• read(α, β, ...)<br>• reduce(α, β, ...)<br>... |

FIG. 14

MEMORY MANAGEMENT TABLE 35

| ACCELERATOR NUMBER | PAGE NUMBER | IN-USE FLAG | DATA NUMBER | PARTITION NUMBER | LOCK FLAG |
|---|---|---|---|---|---|
| 51 | 1 | 1 | 62 | 1 | 1 |
| 51 | 2 | 1 | 62 | 3 | 1 |
| 51 | 3 | 1 | 65 | 1 | 0 |
| 51 | 4 | 0 | - | - | - |
| ... | ... | ... | ... | ... | ... |
| 52 | 1 | 1 | 62 | 2 | 1 |
| 52 | 2 | 1 | 65 | 2 | 0 |
| 52 | 3 | 0 | - | - | - |
| ... | ... | ... | ... | ... | ... |

FIG. 15

DATA MANAGEMENT TABLE 34

| DATA NUMBER | PARTITION NUMBER | CALCULATION COMPLETION FLAG | SWAP FLAG | ACCELERATOR NUMBER | PAGE NUMBER |
|---|---|---|---|---|---|
| 62 | 1 | 1 | 0 | 51 | 1 |
| 62 | 2 | 1 | 0 | 52 | 1 |
| 62 | 3 | 1 | 0 | 51 | 2 |
| 65 | 1 | 0 | 0 | 51 | 3 |
| 65 | 2 | 0 | 0 | 52 | 2 |
| ... | ... | ... | ... | ... | ... | ated States

ACCELERATOR CONTROL APPARATUS FOR ANALYZING BIG DATA, ACCELERATOR CONTROL METHOD, AND PROGRAM

CROSS REFERENCE TO RELATED APPLICATION

This application is a National Stage of International Application No. PCT/JP2017/003028 filed Jan. 27, 2017, claiming priority based on Japanese Patent Application No. 2016-015352 filed Jan. 29, 2016, the disclosure of which is incorporated herein in its entirety by reference thereto.

TECHNICAL FIELD

The present invention relates to an accelerator control apparatus, an accelerator control method, and a program. In particular, it relates to an accelerator control apparatus, an accelerator control method, and a program for controlling calculation using an accelerator(s).

BACKGROUND

In recent years, there has been an increasing need for discovering unknown phenomena or foreseeing or predicting phenomena that could happen in the future by analyzing big data such as satellite image or sensor data in real time. The capacity of the data to be analyzed has been increasing with the improvement in sensing accuracy. However, it is difficult for an individual operator (or company) to occupy a cluster of 100 to 1,000 computers (a computer cluster) in terms of cost.

For this reason, more and more operators have recently started to use accelerators including GPUs (Graphical Processing Units) or the like when performing the above real-time analysis. PTL (Patent Literature) 1 discloses an example of an accelerator control apparatus. As illustrated in FIG. 22, the accelerator control apparatus disclosed in PTL 1 is configured by an information processing apparatus 8. The information processing apparatus 8 includes a shared memory 81 and a plurality of accelerators 821 to 823 connected to the shared memory 81.

The shared memory 81 holds data processed by the accelerators 821 to 823. The accelerators 821 to 823 process data moved from the shared memory 81 to memories (not illustrated) of the accelerators 821 to 823. The accelerators 821 to 823 move data that has been processed thereby from the respective memories back to the shared memory 81. The movement and the processing of the data are repeated until desired processing is completed.

PTL 1: Japanese Patent Kokai Publication No. JP2013-025392A

SUMMARY

The disclosure of the above PTL is incorporated herein by reference thereto. The following analysis has been made by the present inventors.

In accordance with the technique disclosed in PTL 1, it takes time to move data from the shared memory to the memory of an accelerator. Thus, calculation using the accelerator could not be performed at high speed. In addition, for the same reason, when calculation is performed by using a plurality of accelerators, reduction of the overall calculation time on the basis of the number of accelerators used could not be achieved. Thus, scalability could not be achieved.

Instead of adopting a clustering technique, accelerators including GPUs (Graphical Processing Units) or the like may be used. In this case, the number of nodes can be reduced to $1/10$, for example. When an accelerator is used, the memory capacity is reduced to $1/1000$ of that according to a clustering technique. Thus, since data overflows from the memory of an accelerator (an accelerator memory), Out-of-Core processing in which data is exchanged between a shared memory (or a main memory) and the accelerator memory is performed more frequently. In a typical example, when an accelerator is used, the processing performance and the memory capacity change as follows from those according to a clustering technique.

Processing Performance: 100 gigaflops (CPU: Central Processing Unit)→1 teraflop (GPU)

Memory Capacity: 1 terabyte (CPU)→10 gigabytes (GPU)

However, the I/O (Input/Output) band for inputting/outputting data to/from an accelerator is much narrower, compared with the calculation performance of a GPU. In a typical example, the I/O band is 32 gigabyte/second (GB/s) with respect to the calculation performance of 1 teraflop (TFlop). Thus, the I/O of data between an individual accelerator memory and a main memory could be a bottleneck to increasing the processing speed.

Thus, there is a demand for increasing the speed of processing performed on a task(s) using an accelerator(s) including a memory(ies). It is an object of the present invention to provide an accelerator control apparatus, an accelerator control method, and a program that contribute to meeting the demand. Other demands and objects of the present invention will become apparent from the description of the following exemplary embodiments.

An accelerator control apparatus according to a first aspect of the present invention includes: a task storage part which holds an executable task(s); a data scheduler which selects a task needing a relatively small input/output data amount on a memory included in an accelerator when the task is executed by the accelerator from the executable task(s) and instructs the accelerator to prepare for data I/O on the memory for the selected task; and a task scheduler which instructs the accelerator to execute the selected task and adds a task that becomes executable upon completion of the selected task to the task storage part, wherein the data scheduler continues, depending on a use status of the memory, selection of a next task from the executable task(s) held in the task storage part and preparation of data I/O for the next task selected.

An accelerator control method according to a second aspect of the present invention includes: storing an executable task(s) a storage part; selecting a task needing a relatively small input/output data amount on a memory included in an accelerator when the task is executed by the accelerator from the executable task(s) and instructing the accelerator to prepare for data I/O on the memory for the selected task; instructing the accelerator to execute the selected task and adding a task that becomes executable upon completion of the selected task to the storage part; and continuing, depending on a use status of the memory, selection of a next task from the executable task(s) held in the storage part and preparation of data I/O for the next task selected.

A program according to a third aspect of the present invention causes a computer to execute processing for: storing an executable task(s) a storage part; selecting a task needing a relatively small input/output data amount on a memory included in an accelerator when the task is executed by the accelerator from the executable task(s) and instructing the accelerator to prepare for data I/O on the memory for the selected task; instructing the accelerator to execute the selected task upon completion of preparation of the data I/O on the memory and adding a task that becomes executable upon completion of the selected task to the storage part; and continuing, depending on a use status of the memory, selection of a next task from the executable task(s) held in the storage part and preparation of data I/O for the next task selected. The program can be provided as a program product recorded in a non-transitory computer-readable storage medium.

The accelerator control apparatus, the accelerator control method, and the program according to the present invention can increase the speed of processing performed on a task(s) using an accelerator(s) including a memory (ies).

BRIEF DESCRIPTION OF THE DRAWINGS

FIG. 9 illustrates an example of a reservation API (Application Programming Interface) and an execution API of the accelerator control apparatus according to the first exemplary embodiment.

FIG. 14 illustrates an example of a configuration of a memory management table of the accelerator control apparatus according to the first exemplary embodiment.

FIG. 15 illustrates an example of a configuration of a data management table of the accelerator control apparatus according to the first exemplary embodiment.

PREFERRED MODES

Figure 1:
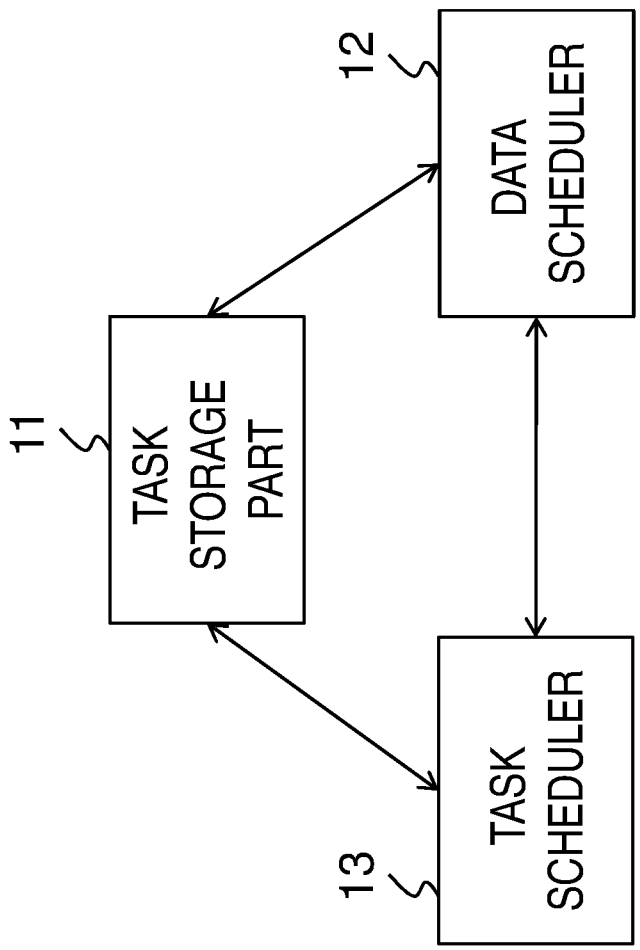
FIG. 1 is a block diagram illustrating an example of a configuration of an accelerator control apparatus according to an exemplary embodiment.

First, an outline of an exemplary embodiment will be described. Reference characters in the following outline are merely used as examples to facilitate understanding of the present invention. Therefore, the reference characters are not intended to limit the present invention to the illustrated modes.

FIG. 1 is a block diagram illustrating an example of a configuration of an accelerator control apparatus 10 according to an exemplary embodiment. As illustrated in FIG. 1, the accelerator control apparatus 10 includes a task storage part 11, a data scheduler 12, and a task scheduler 13.

Figure 10:
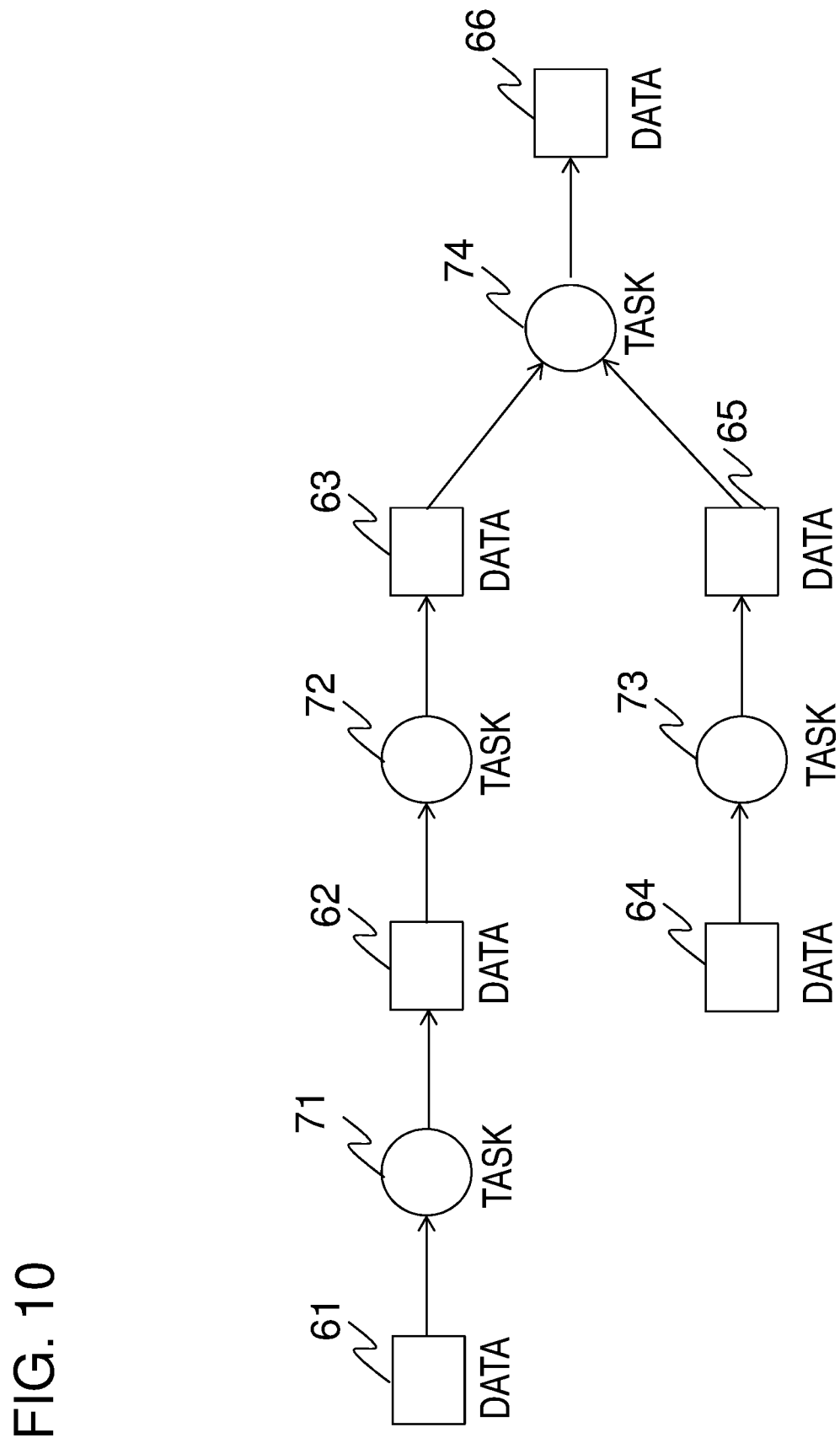
FIG. 10 illustrates an example of a configuration of a DAG (Directed Acyclic Graph) of the accelerator control apparatus according to the first exemplary embodiment.
Figure 11:
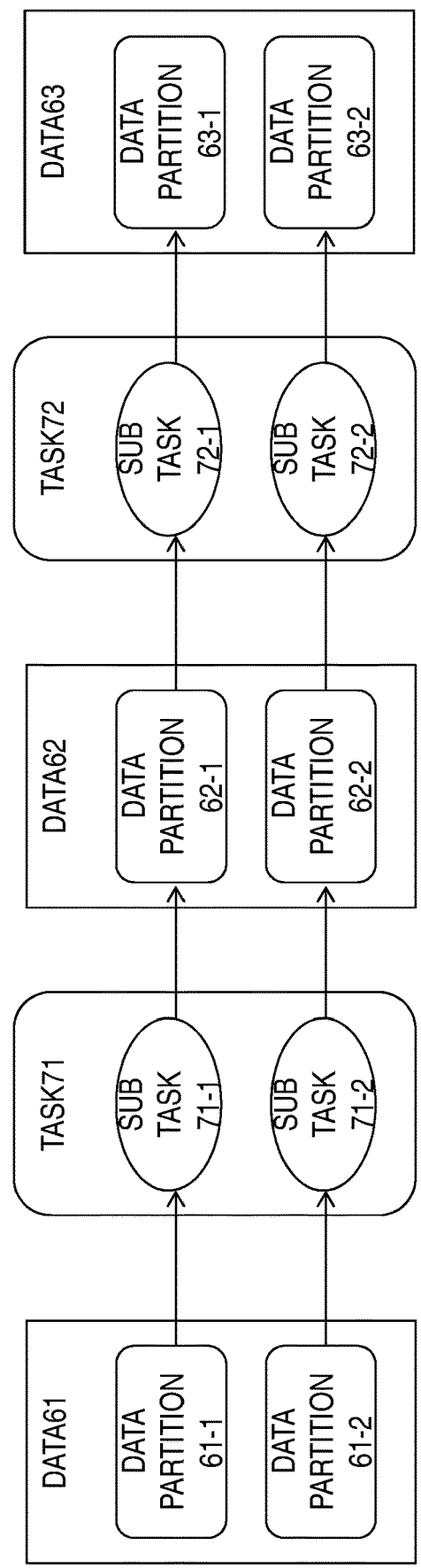
FIG. 11 illustrates division of data and processing performed by the accelerator control apparatus according to the first exemplary embodiment.
Figure 12:
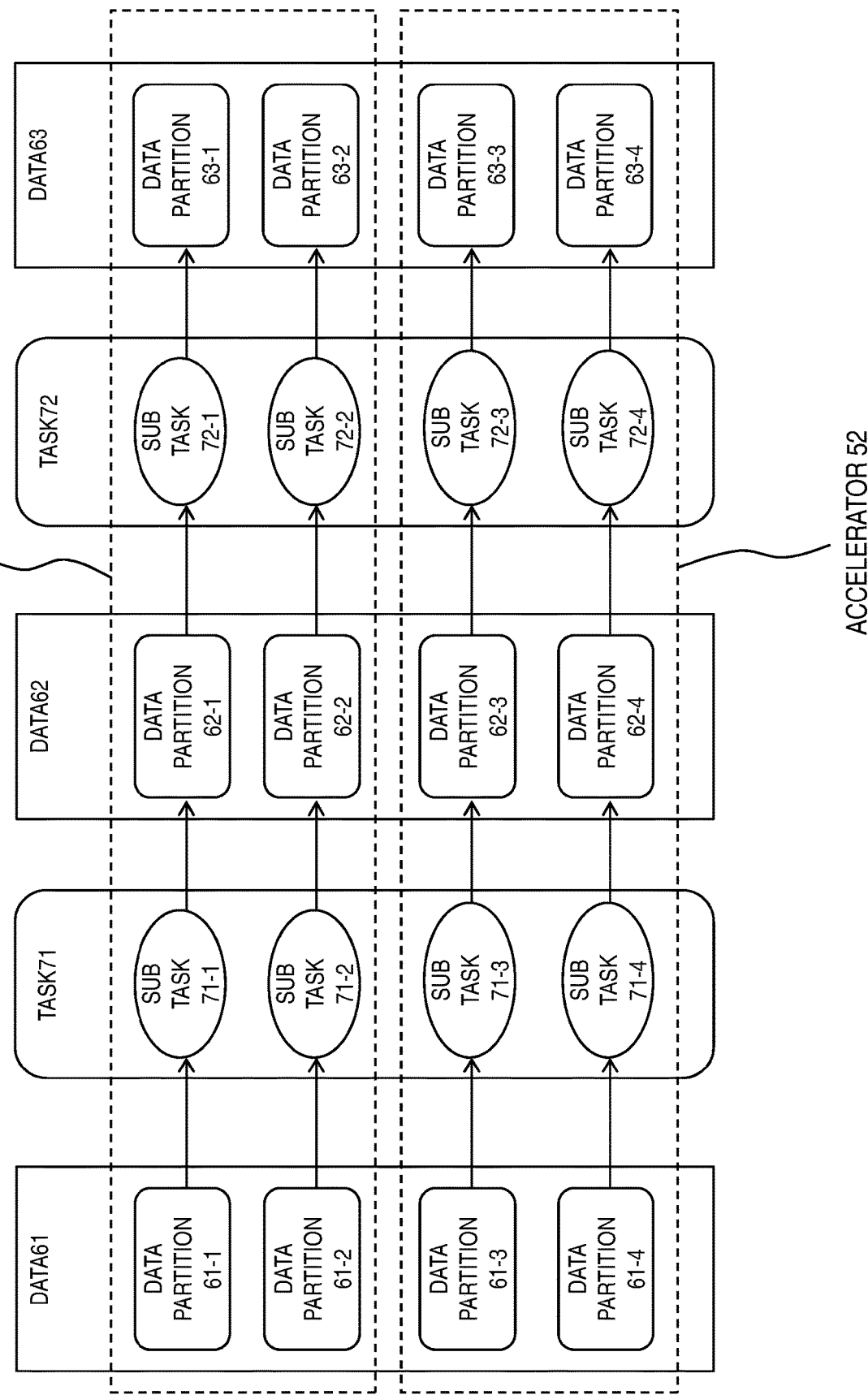
FIG. 12 illustrates division of data and processing performed by the accelerator control apparatus according to the first exemplary embodiment.

The task storage part 11 holds executable tasks (for example, tasks that can be executed among the tasks illustrated in FIG. 10 or subtasks that can be executed among the subtasks illustrated in FIGS. 11 and 12). The data scheduler 12 selects, from the executable tasks, a task needing a relatively small (the smallest, for example) I/O data amount on a memory included in an accelerator (for example, an accelerator having an accelerator memory in FIG. 8) and instructs the accelerator to prepare for data I/O on the memory for the selected task. The task scheduler 13 instructs the accelerator to execute the selected task (for example, upon completion of the preparation of the data I/O on the memory) and adds a task that becomes executable upon completion of the selected task (for example, a task 72 that becomes executable upon completion of a task 71 in FIG. 10) to the task storage part 11. In addition, depending on a use status of the memory, the data scheduler 12 continues selection of the next task from the executable tasks held in the task storage part 11 and preparation of data I/O for the next task selected.

Namely, the accelerator control apparatus 10 adopts a configuration that continues selection of a task needing a relatively small data I/O amount on a memory in an accelerator as the next task and preparation of data I/O for the selected task depending on a use status of the memory (for example, if there is a sufficient capacity in the memory). In this way, the data I/O amount between an individual accelerator memory and an external memory can be reduced, and simultaneously, the I/O band between the individual accelerator memory and the external memory can be effectively used. Thus, the accelerator control apparatus 10 can increase the speed of processing performed on a task(s) using an accelerator(s) including a memory(ies).

Figure 2A:
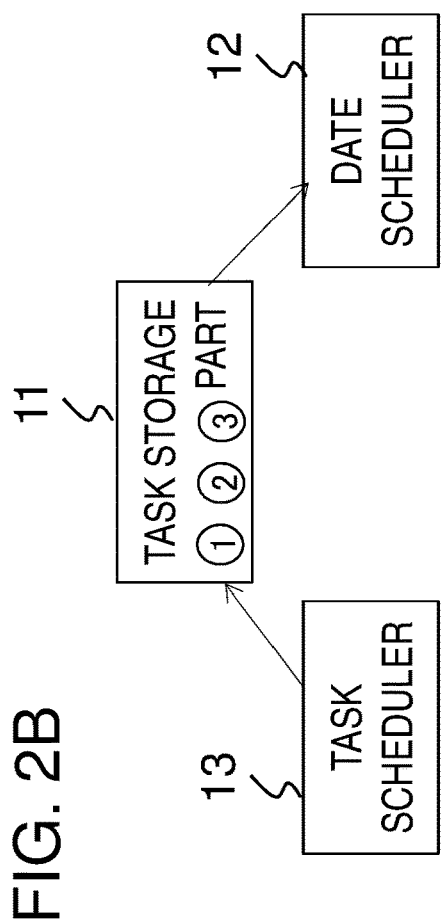
FIGS. 2A-2D illustrate an example of an operation of the accelerator control apparatus according to the exemplary embodiment.

FIGS. 2A-2D illustrate an example of an operation of the accelerator control apparatus 10 in FIG. 1. FIG. 2A illustrates an example of a DAG (Directed Acyclic Graph) representing processing of a user program. In FIG. 2A, as an example, an individual node in the DAG in FIG. 2A represents a subtask obtained by dividing a task (see FIGS. 11 and 12).

Figure 2B:
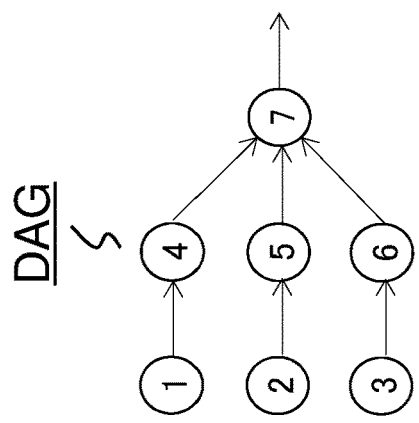

As illustrated in FIG. 2B, the task scheduler 13 and the data scheduler 12 operate in a parallel manner. The task scheduler 13 loads executable subtasks "1" to "3" in an executable list in the task storage part 11. The data scheduler 12 selects a subtask needing the smallest I/O of input data on an accelerator (or an accelerator memory) among the subtasks in the executable list held in the task storage part 11 and performs the data I/O needed to execute the subtask. For example, when only input data for the subtask "2" is cached in a memory of an accelerator, the data scheduler 12 selects the subtask "2". In addition, the data scheduler 12 removes the entry corresponding to the selected subtask "2" from the executable list in the task storage part 11.

Figure 2C:
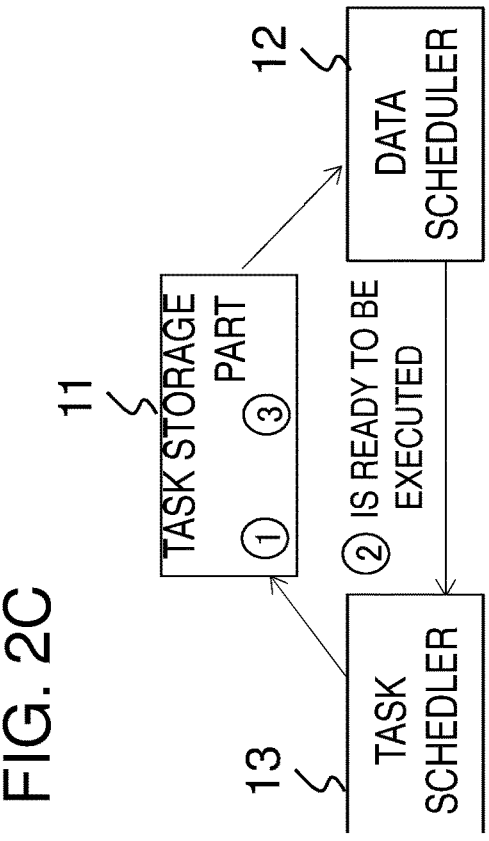

As illustrated in FIG. 2C, the data scheduler 12 completes the I/O of the input data and ensuring of an output memory for executing the subtask "2", locks these memory areas, and notifies the task scheduler 13 that the subtask "2" can be executed. The data scheduler 12 selects a subtask for which the next I/O needs to be performed from the executable list in the task storage part 11. The present example assumes that the data scheduler 12 has selected the subtask "1". The task scheduler 13 executes the subtask "2".

Figure 2D:
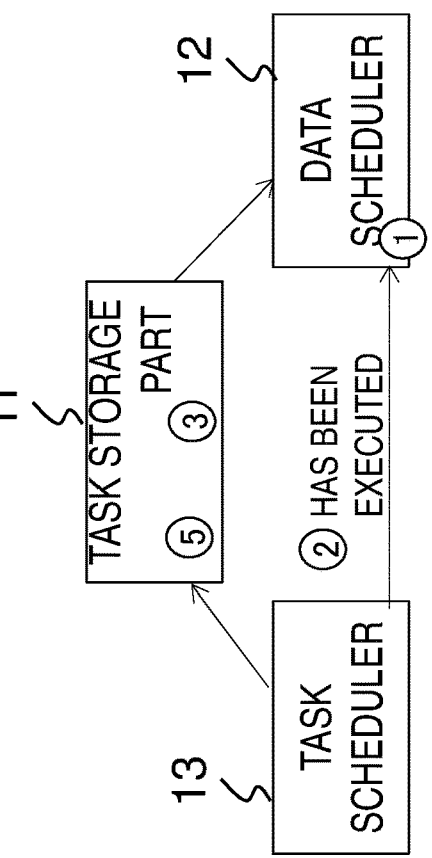

As illustrated in FIG. 2D, the task scheduler 13 completes execution of the subtask "2" and notifies the data scheduler 12 that the subtask "2" has been executed. The data scheduler 12 unlocks the I/O data for the subtask "2". In the case of the DAG in FIG. 2A, since a subtask "5" becomes executable, the task scheduler 13 loads the subtask "5" in the executable list in the task storage part 11.

The like processing is subsequently performed by a parallel operation of the task scheduler 13 and the data scheduler 12. When a plurality of accelerators exist, the data scheduler 12 performs the above processing per accelerator.

As described above, while the task scheduler 13 is executing a subtask, the data scheduler 12 continuous selection of a subtask needing the smallest data I/O amount on a memory of an accelerator as the next task and preparation for data I/O for the selected subtask. In this way, the data I/O amount between an individual accelerator memory and an external memory can be reduced, and simultaneously, the I/O band between the individual accelerator memory and the external memory can be effectively used. Thus, the accelerator control apparatus 10 can increase the speed of processing performed on a task(s) using an accelerator(s) including a memory(ies).

Figure 3:
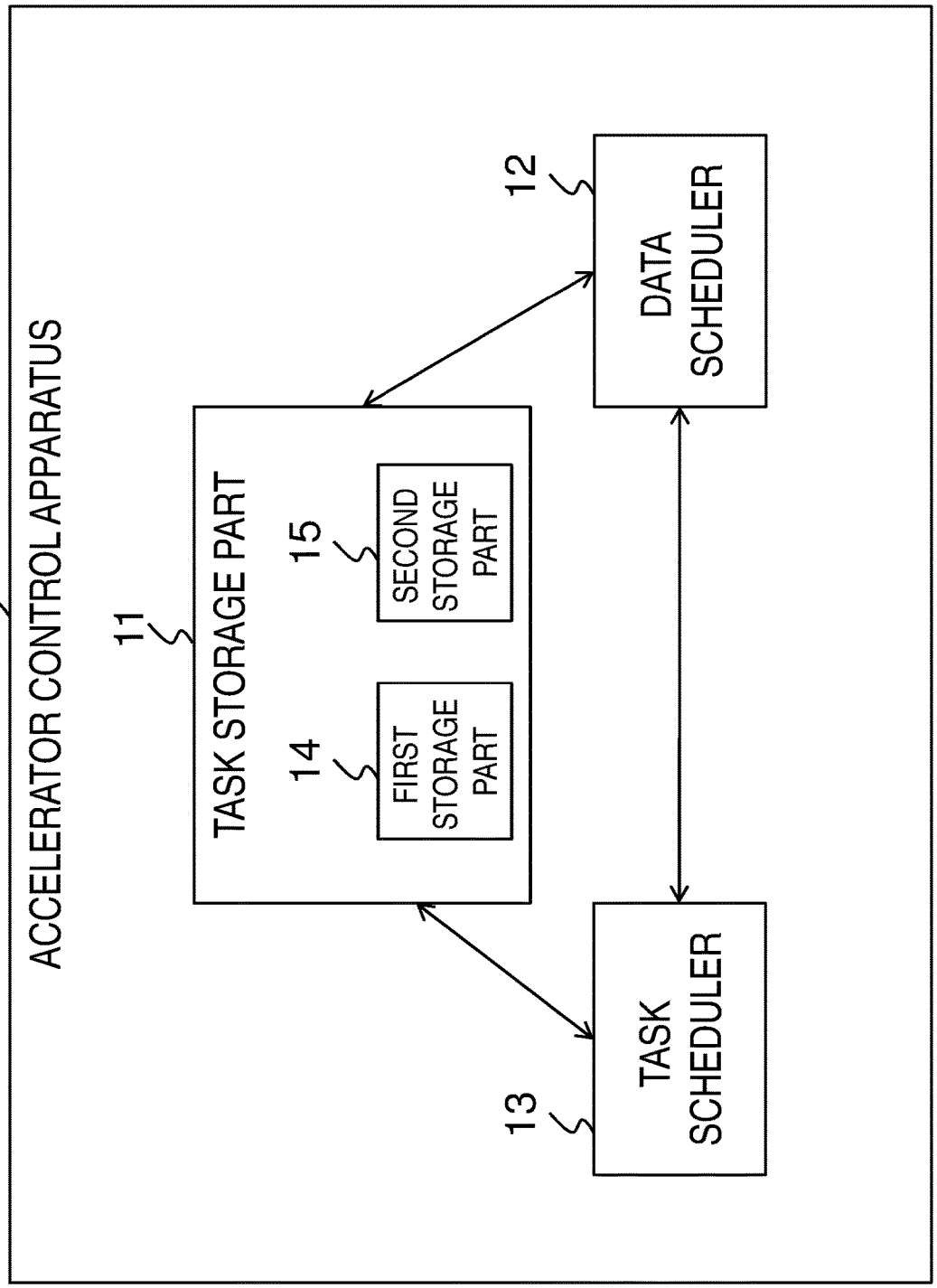
FIG. 3 is a block diagram illustrating an example of another configuration of the accelerator control apparatus according to the exemplary embodiment.

FIG. 3 is a block diagram illustrating an example of another configuration of the accelerator control apparatus 10 according to the exemplary embodiment. As illustrated in FIG. 3, the task storage part 11 includes a first storage part 14 which holds an executable task(s) (or an executable subtask(s)) that can be executed by an arbitrary unlimited accelerator(s) and a second storage part 15 which holds a task(s) that can be executed only by a limited accelerator(s). In this configuration, the data scheduler 12 selects a task needing a relatively small (the smallest, for example) I/O data amount on a memory when the task is executed by a corresponding accelerator from the task(s) held in the first storage part 14 and the task(s) held in the second storage part 15 and executed by the limited accelerator.

For example, the first storage part 14 holds a task, the most upstream task or all the upstream tasks of which have been executed. In contrast, as a task that can be executed only by a limited accelerator, the second storage part 15 holds a task, at least one of the upstream tasks of which stands by for execution by the certain accelerator (namely, the preparation of the data I/O is completed, and the task stands by for execution by the corresponding accelerator) and all the remaining upstream tasks of which have been executed.

Figure 4:
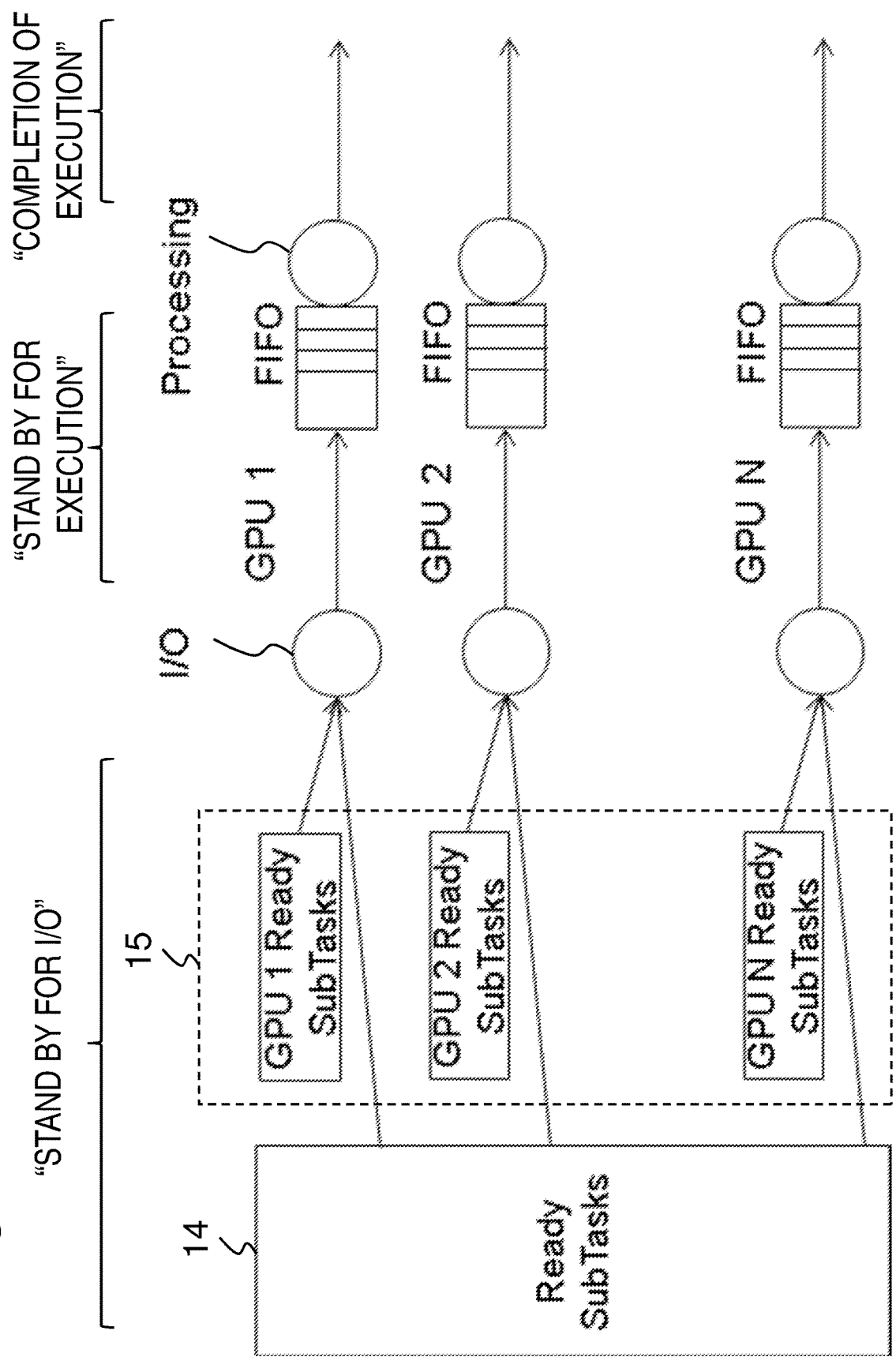
FIG. 4 illustrates an example of an operation of the accelerator control apparatus according to the exemplary embodiment.

FIG. 4 illustrates an operation of the accelerator control apparatus 10 illustrated in FIG. 3. FIG. 4 assumes that accelerators 51 to 5N (N is a natural number) have GPUs 1 to N, respectively. The first storage part 14 holds subtasks that can be executed by arbitrary unlimited accelerators. In contrast, the second storage part 15 holds subtasks that are executed only by limited accelerators (or GPUs) per accelerator. The subtasks accumulated in the first storage part 14 and the second storage part 15 are in a state referred to as "stand by for I/O".

The data scheduler 12 selects a subtask needing the smallest I/O data amount on a memory when the subtask is executed by a corresponding accelerator (for example, an accelerator corresponding to the GPU 1) from the subtasks (Ready Subtasks) held in the first storage part 14 and the subtasks (for example, GPU 1 Ready Subtasks) that are held in the second storage part 15 and executed by the limited accelerator. When the preparation of the data I/O for the subtask selected by the data scheduler 12 (I/O in FIG. 4) is completed, the subtask is stored in a queue (FIFO: First-In First-Out) for the corresponding GPU and is brought in a state referred to as "stand by for execution". The subtasks stored in the queue are sequentially executed by the GPU (for example, the GPU 1) of the corresponding accelerator (Processing in FIG. 4). After completion of a subtask, this subtask is brought in a state referred to as "completion of execution".

Figure 5A:
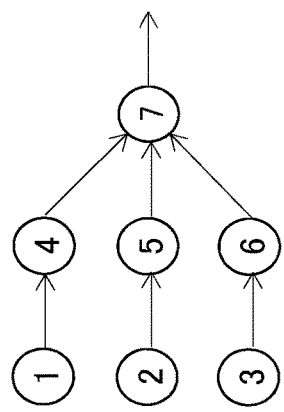
FIGS. 5A-5B illustrate an example of an operation of the accelerator control apparatus according to the exemplary embodiment.
Figure 5B:
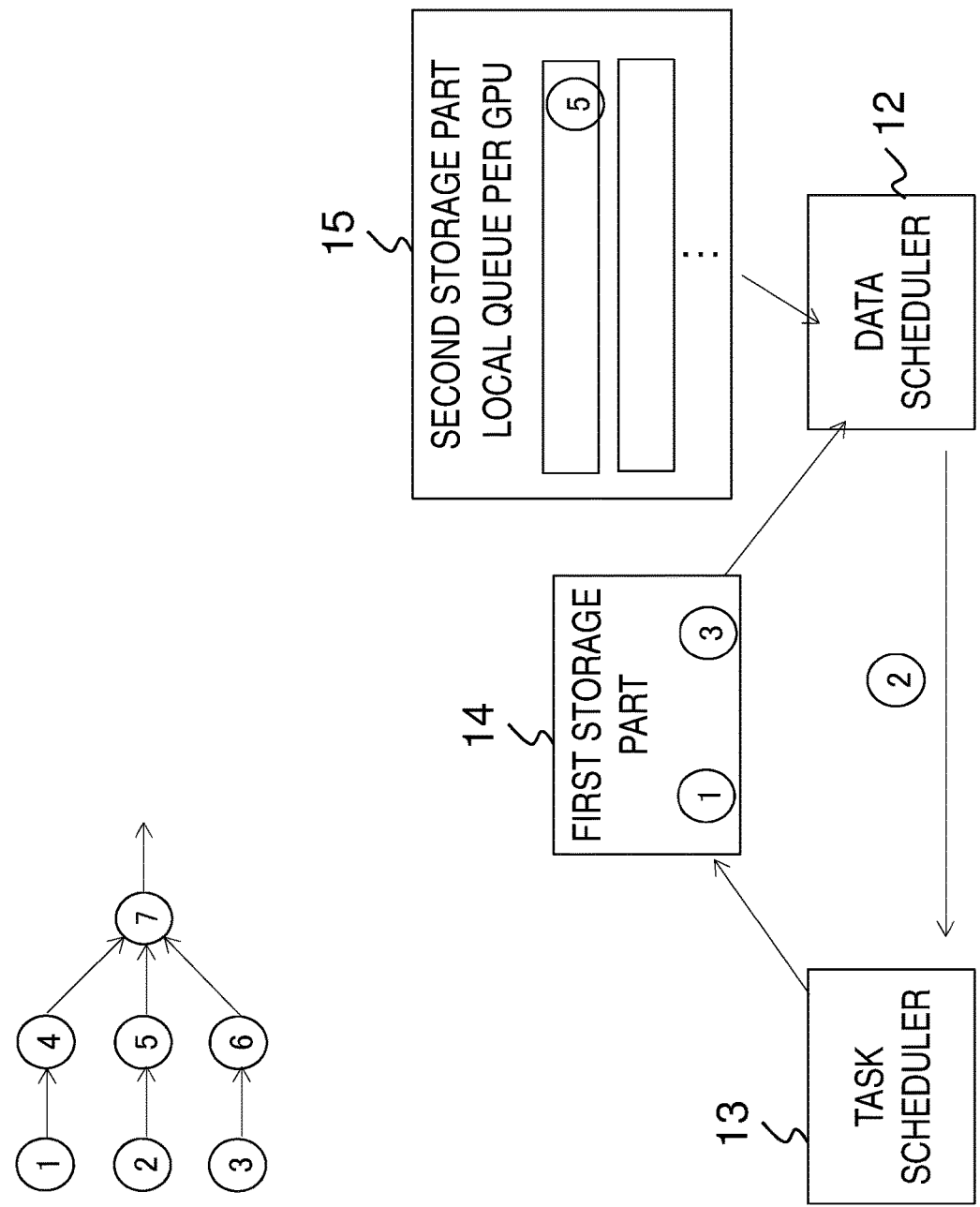

FIGS. 5A-5B illustrate an example of an operation of the accelerator control apparatus 10 illustrated in FIG. 3. FIG. 5A illustrates an example of a DAG representing processing of a user program. In FIG. 5A, as an example, an individual node in the DAG represents a subtask obtained by dividing a task. As illustrated in FIG. 5B, when setting the subtask "2" in the state "stand by for execution" by an accelerator", the data scheduler 12 (or the task scheduler 13) adds the subtask "5", which becomes executable upon completion of the subtask "2", to a local queue that is held in the second storage part 15 and that corresponds to the corresponding accelerator (GPU). When scheduling a subtask, the data scheduler 12 refers to the executable list held in the first storage part 14 and the local queue that is held in the second storage part 15 and that corresponds to the scheduling target accelerator (or GPU) and selects a subtask needing the smallest I/O data amount on a memory when the subtask is executed on the corresponding accelerator from the subtasks held in the list and the queue. Since the operations are serialized in the individual accelerators, no problem is caused when the subtask "5" is selected in the state illustrated in FIGS. 5A-5B. The data scheduler 12 does not consider the other accelerators in selecting the subtask. In addition, when selecting the subtask "5", if there is a subtask that becomes executable upon completion of the subtask "5", the data scheduler 12 (or the task scheduler 13) adds this subtask to the local queue of the corresponding accelerator (or GPU). Upon completion of a subtask, if there is a relevant entry in a local queue held in the second storage part 15 (namely, if there is a subtask that can be executed by an arbitrary unlimited accelerator, for example, if there is a subtask, all the upstream subtasks of which have been executed), the task scheduler 13 moves this entry from the second storage part 15 to the executable list held in the first storage part 14.

As described above, the accelerator control apparatus 10 illustrated in FIG. 3 includes the first storage part 14 which holds a task(s), the most upstream task or all the upstream tasks of which have been executed, and the second storage part 15 which holds, as a task(s) that can be executed only by a limited accelerator(s), a task(s), at least one of the upstream tasks of which stands by for execution by the certain accelerator(s) and all the remaining upstream tasks of which have been executed. In addition, the data scheduler 12 in the accelerator control apparatus 10 selects a task needing the smallest I/O data amount on a memory when the task is executed on a corresponding accelerator from the tasks held in the first storage part 14 and the tasks held in the second storage part 15 and executed by the limited accelerator. In this way, the speed of processing performed on a task(s) using an accelerator(s) including a memory(ies) can be increased further. This is because, when a task is brought in the state "stand by for execution" before the state "completion of execution", the data scheduler 12 can set a downstream task, which becomes executable upon completion of the current task, as a candidate of a task for which the preparation of I/O data is started.

Next, a comparative example will be described to clarify an advantageous effect obtained by the accelerator control apparatus 10 (FIGS. 1 and 3) according to the exemplary embodiment.

Figure 6:
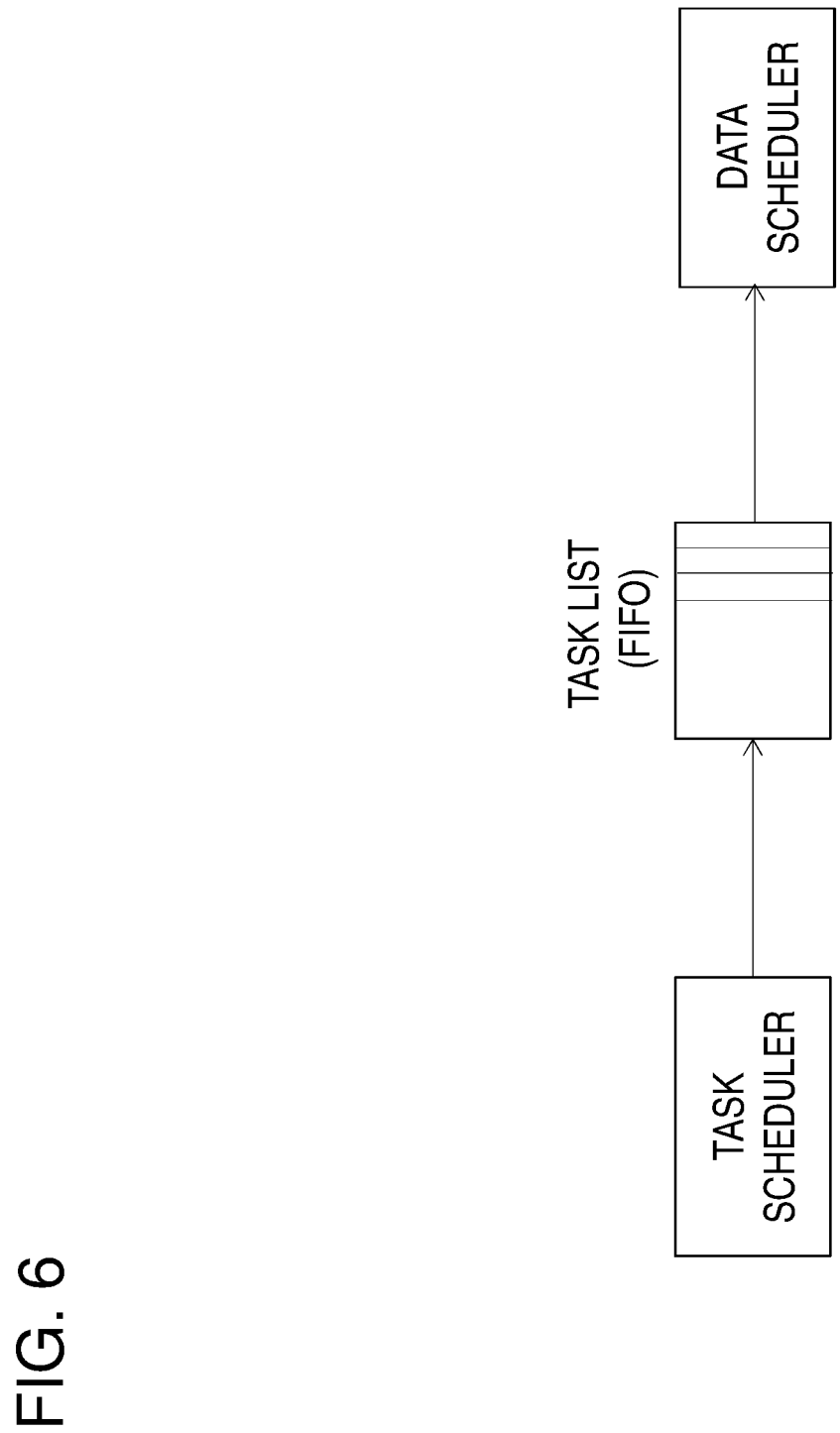
FIG. 6 illustrates an operation according to a comparative example.

FIG. 6 illustrates an operation according to a comparative example. According to this comparative example illustrated in FIG. 6, when an individual subtask becomes executable upon completion of its upstream subtask, preparation of input data and ensuring of an output memory area are sequentially performed.

Figure 7:
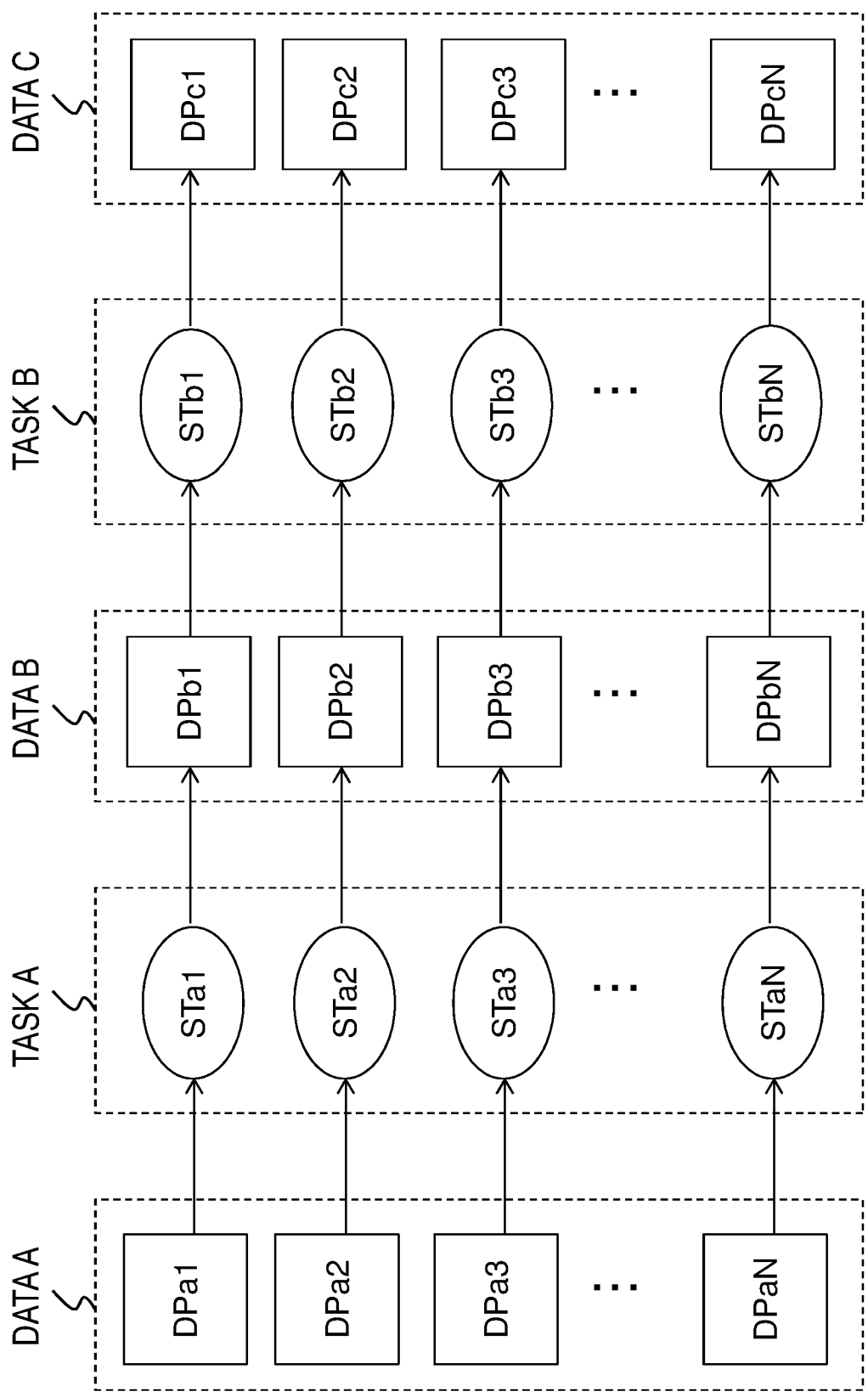
FIG. 7 illustrates an advantageous effect obtained by the accelerator control apparatus according to the exemplary embodiment.

FIG. 7 illustrates an advantageous effect obtained by the accelerator control apparatus 10 according to the exemplary embodiment. As illustrated in FIG. 7, data A to C in a DAG is each divided into n data partitions (N is a natural number). Likewise, tasks A and B are each divided into n subtasks. For example, when these subtasks STa1 to STaN are applied to the respective data partitions DPa1 to DPaN, the same results as those obtained when the division is not performed (namely, the same results as those obtained by applying the task A to the data A) are obtained. This example assumes that all the data partitions of both the data A and B cannot be held simultaneously in an accelerator memory.

According to the comparative example illustrated in FIG. 6, when subtasks in FIG. 7 are processed, first, the subtasks STa1 to STaN are loaded in a FIFO. Thereafter, the subtasks STb1 to STbN are loaded into the FIFO. However, since all the data A and B cannot be loaded to an accelerator memory, when the subtasks STa1 to STaN are executed, at least a part of the data partitions DPb1 to DPbN to be used later (for example, the data partition DPbx) needs to be swapped out (swap-out, namely, movement of data from an accelerator memory to a main memory). Subsequently, when the subtask STbx is executed, the data partition DPbx that has been swapped out needs to be swapped in (swap-in, namely, movement of data from the main memory to the accelerator memory).

In contrast, after executing the subtasks STa1 and STb1, the accelerator control apparatus 10 according to the exemplary embodiment executes the subtasks STa2 and STb2. Thus, no data partition (for example, the data partition DPbx) needs to be swapped (swap, namely, I/O), unlike the comparative example. Thus, according to the exemplary embodiment, the data I/O between an individual accelerator and a main memory can be made less than that according to the comparative example, and the processing speed can be increased.

Exemplary Embodiment 1

Next, an accelerator control apparatus according to a first exemplary embodiment will be described in detail with reference to drawings.

Configuration

Figure 8:
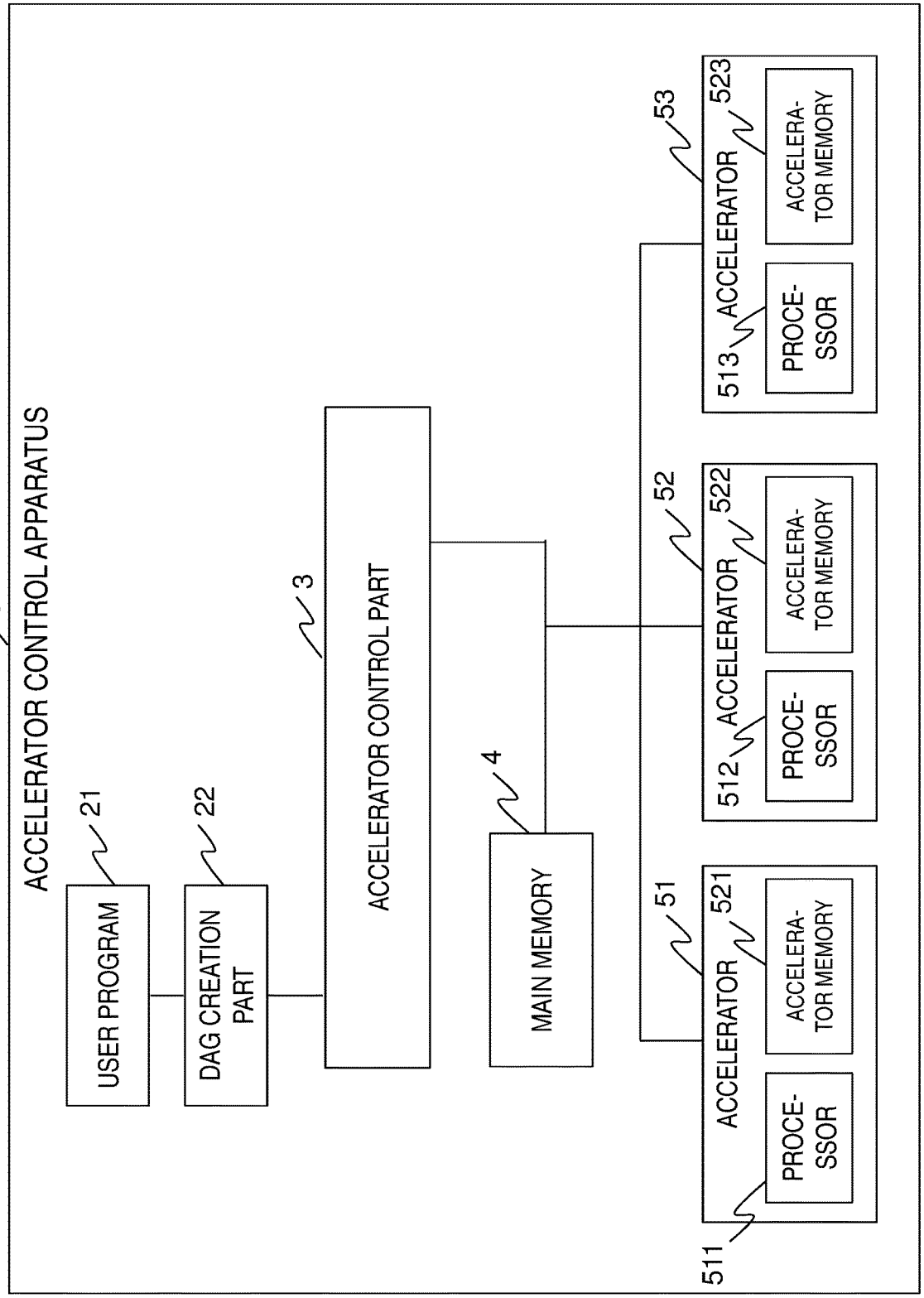
FIG. 8 is a block diagram illustrating an example of a configuration of an accelerator control apparatus according to a first exemplary embodiment.

FIG. 8 is a block diagram illustrating an example of a configuration of an accelerator control apparatus 1 according to the present exemplary embodiment. As illustrated in FIG. 8, the accelerator control apparatus 1 includes accelerators 51 to 53, a main memory 4, an accelerator control part 3, a user program 21, and a DAG (directed acyclic graph) creation part 22. For example, the accelerator control apparatus 1 is realized by a host computer. The user program 21 may be a component outside the accelerator control apparatus 1.

The accelerators 51 to 53 execute calculation processing.

The main memory 4 is a memory to which data that cannot be held due to a lack of memory resources in the accelerators 51 to 53 is evacuated.

The accelerator control part 3 controls the accelerators 51 to 53.

When the user program 21 calls an API (Application Programming Interface), the DAG creation part 22 creates a DAG (directed acyclic graph) representing the processing of the user program 21 and transmits the DAG to the accelerator control part 3.

In FIG. 8, three accelerators are illustrated for convenience of description. However, the number of accelerators is not limited to the illustrated mode, as long as at least one accelerator is used. Examples of the accelerators include, but not particularly limited to, GPUs (Graphical Processing Units) of NVIDIA Corporation and Xeon Phi of Intel Corporation. The individual accelerator is a co-processor of a CPU (central processing unit) of a computer and is implemented, for example, when inserted into an I/O (Input/Output) slot of a computer.

Hereinafter, when the same description applies to the plurality of accelerators 51 to 53, only the accelerator 51 will be described. However, the same description also applies to the accelerators 52 and 53.

The accelerator 51 includes a processor 511 that processes data and an accelerator memory 521 that holds data. Herein, a local memory included in an accelerator will be referred to as an accelerator memory.

The user program 21 is an application program created by a programmer (a user) who uses the accelerators 51 to 53 or an application program executed by a user. For example, the user program 21 is implemented by using an API provided by the DAG creation part 22. For example, the DAG creation part 22 provides two kinds of API, which are a reservation API and an execution API, as illustrated in FIG. 9.

The reservation API corresponds to a single task (or processing) in a DAG illustrated in FIG. 10. When the user program 21 calls a reservation API, the DAG creation part 22 adds a single task and data generated by the task to a DAG. For example, in FIG. 10, when a task 71 is called by using the reservation API for data 61, the DAG creation part 22 adds the task 71 and the data 62, which is the output data generated by the task 71 to a DAG. The reservation API is also an API for reserving a task. Namely, immediately after the reservation API is called, no tasks are executed by the accelerators 51 to 53. Instead, only a DAG is generated.

In contrast, when the execution API is called, there are cases in which a new task and data generated by the task are added and there are cases in which a new task and data generated by the task are not added. In addition, calling of the execution API triggers execution of a task in a DAG that has already been generated. A task belonging to the execution API corresponds to a case in which data obtained after a DAG is processed is needed in the user program 21 and a case in which "storeObject" for storing calculation result data in an accelerator memory as a data object is used, for example.

There are cases in which the reservation API and the execution API have one or a plurality of arguments $\alpha$, $\beta$, $\gamma$, etc. as illustrated in FIG. 9. One of these arguments could be a kernel function. The kernel function is a function indicating processing that the user program 21 performs on data. Whether the API has a function as an argument depends on the kind of reservation API or execution API. The reservation API and execution API indicate a pattern of processing performed on data, and actual specific processing is performed by a kernel function given as an argument of the reservation API and execution API in the user program 21.

An example of the API having a kernel function as an argument is "map". In the case of "map", a kernel function is applied to all the elements constituting input data. The input data in a DAG is, for example, an image or a database table. When "map" is applied to these data, a kernel function is applied to an individual pixel of the image and an individual entry of the database.

In contrasts, as API that does not need a kernel function, for example, there are "storeObject," "appendObject," and "read". First, "storeObject" is an API for storing a calculation result in one of the accelerator memories 521 to 523 as a data object. With this "storeObject", a name can be given to data held as a data object in one of the accelerator memories 521 to 523. In this operation, an object name is given as an argument of "storeObject". In addition, "appendObject" is an API used when data is added to an end of an existing object. In addition, "read" is an API for bringing a content of a data object that exists on one of the accelerators 51 to 53 to a user space.

In addition, a data object held in one of the accelerator memories 521 to 523 can be specified as input data for a task in a DAG. In this case, an object name held in one of the accelerators 51 to 53 is specified as input data for processing performed with the reservation API or the execution API. This name has been given by a program that has called "storeObject".

Individual data in a DAG may be configured by two or more partitions (data partitions) as illustrated in FIG. 11. FIG. 11 illustrates an example obtained by dividing each of the data 61, task 71, data 62, task 72, and data 63 in the DAG in FIG. 10 into two data partitions. In this case, for example, when the task 71 is applied to data partitions 61-1 and 61-2, the same result as that obtained by processing in which the data 61 is not divided into two data partitions 61-1 and 61-2 can be obtained. This belongs to a processing mode called data parallel in parallel calculation and is generally known processing among engineers in the technical field to which the present invention belongs. In FIG. 11, for example, the processing performed on the data partition 61-1 is indicated as the subtask 71-1. However, the processing content of the subtask 71-1 is the same as that of the task 71 in FIG. 10. Processing performed on a plurality of partitions (data partitions) may be separately executed by different accelerators.

FIG. 12 illustrates a case in which the data 61 has been divided into data partitions 61-1 to 61-4. The data partitions 61-1 and 61-2 are processed by the accelerator 51. In contrast, the data partitions 61-3 and 61-4 are processed by the accelerator 52. In an ideal case, this operation achieves the calculation performance twice as good as that of a case in which all the four data partitions is processed by a single accelerator.

The following description will be made based on the case in which data or tasks are divided into partitions as long as no misunderstanding is caused. The description of the case in which data and tasks are not divided will be omitted. Thus, when data is not divided, a data partition in the following description signifies the original data that has not been divided, and a subtask corresponding to a data partition signifies a task corresponding to the original data.

The DAG creation part 22 generates a DAG each time the user program 21 calls the reservation API and the execution API. When the user program 21 calls the reservation API, the DAG creation part 22 adds corresponding processing and output data to a DAG. In contrast, when the user program 21 calls the execution API, if necessary, the DAG creation part 22 adds corresponding processing and output data to a DAG. The DAG creation part 22 notifies the accelerator control part 3 of a DAG that has already been generated.

The DAG created by the DAG creation part 22 includes the kind of reservation API or execution API called by the user program 21 and a kernel function given to an individual API. In addition, the DAG creation part 22 transmits an identifier of the user program 21 when notifying the accelerator control part 3 of a DAG. In addition, when ending the user program 21, the DAG creation part 22 transmits the identifier of the user program 21 to the accelerator control part 3 and requests the accelerator control part 3 to delete intermediate data other than the data specified to be held by "storeObject" among the data generated by the user program 21.

Figure 13:
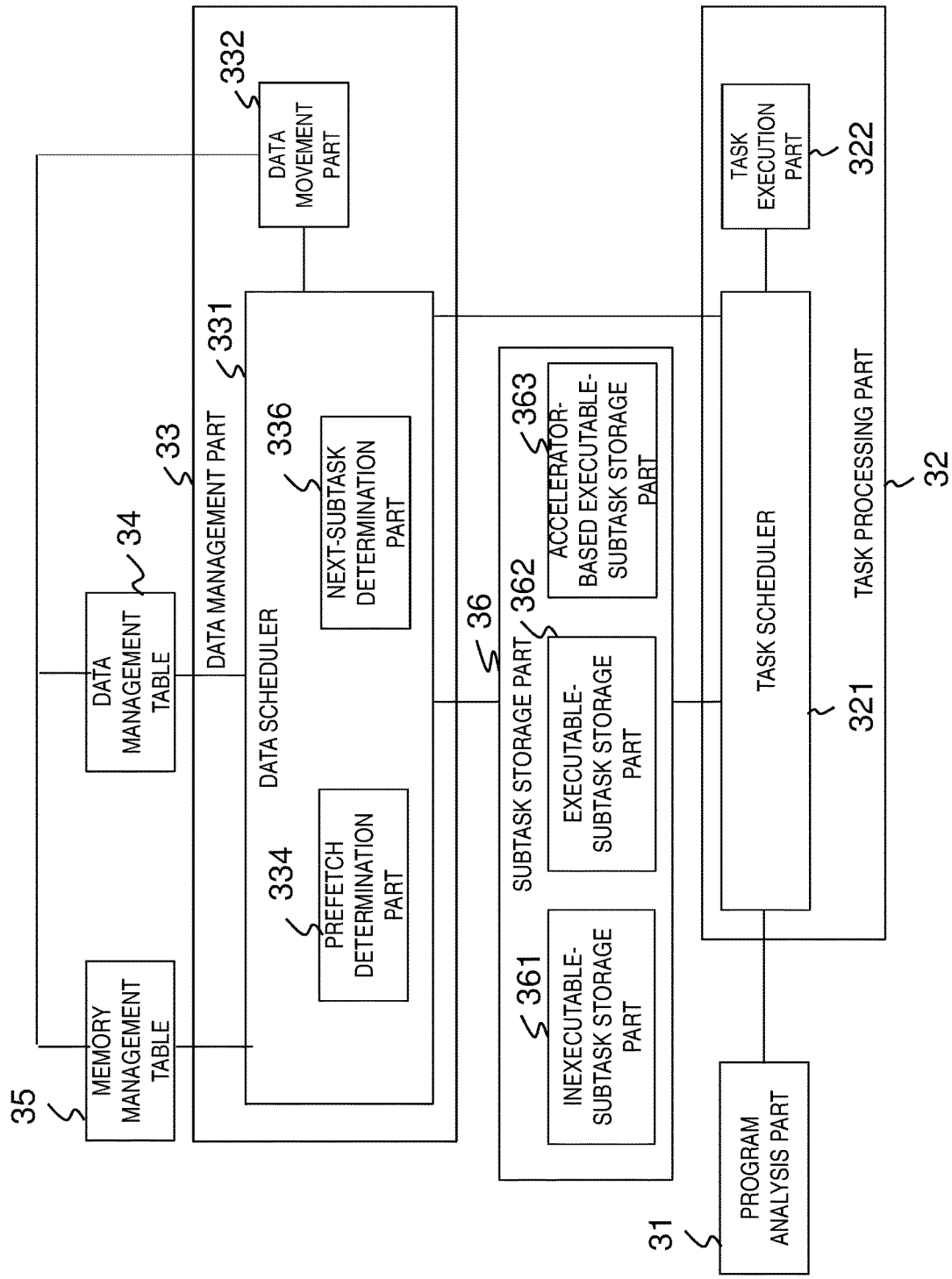
FIG. 13 is a block diagram illustrating an example of a configuration of an accelerator control part of the accelerator control apparatus according to the first exemplary embodiment.

FIG. 13 is a block diagram illustrating an example of a configuration of the accelerator control part 3 of the accelerator control apparatus 1 illustrated in FIG. 8. As illustrated in FIG. 13, the accelerator control part 3 includes a program analysis part 31, a task processing part 32, a subtask storage part 36, a data management part 33, a data management table 34, and a memory management table 35. The program analysis part 31 analyzes a DAG representing processing of the user program 21 received from the DAG creation part 22. The task processing part 32 performs the processing of the DAG. The subtask storage part 36 classifies the subtasks included in the DAG into executable subtasks and inexecutable subtasks and holds these subtasks. The data management part 33 manages and prepares for data necessary for the processing of the DAG. The memory management table 35 manages the memories of the accelerators. The data management table 34 manages data on the memories of the accelerators. An individual one of these components will hereinafter be described in detail.

The memory management table 35 is a table for managing the accelerator memories 521 to 523. Each of the accelerator memories 521 to 523 is divided into pages each having a certain size and managed. For example, the page size is 4 KB or 64 KB. As illustrated in FIG. 14, the memory management table 35 holds information about each page as an entry. Each entry includes an accelerator number to which the corresponding page belongs, a page number, an in-use flag indicating whether the corresponding page is being used, and a data number indicating, if the corresponding page is being used, an identifier of the data held by the corresponding page, a partition number indicating which data partition of the data is held by the corresponding page, and a lock flag indicating whether the corresponding page is being used for calculation and is locked. A boolean value is used for the in-use flag and the lock flag. A data identifier is assigned to data in a DAG.

Herein, as an example, if the corresponding page is being used, the in-use flag represents 1. If not, the in-use flag represents "0". In addition, if the corresponding page is locked, the lock flag represents "1". If not, the lock flag represents "0".

For example, the first entry in the memory management table 35 illustrated in FIG. 14 indicates that page 1 of the accelerator memory 521 held by the accelerator 51 is being currently used by the data partition 62-1 (namely, the first data partition of the data 61) for calculation and is thus locked. The data held by a locked page cannot be evacuated to the main memory 4.

The data management table 34 manages data on the accelerator memories 521 to 523. As illustrated in FIG. 15, the data management table 34 holds information about data in a DAG transmitted from the user program 21. Each entry holds a data number, a partition number of the corresponding data, a calculation completion flag indicating whether the data has already been calculated, a swap flag indicating whether the corresponding data has already been evacuated to the main memory 4, an accelerator number indicating the accelerator holding the corresponding data, and a page number of the accelerator holding the corresponding data. A boolean value is used for the calculation completion flag and the swap flag.

Herein, as an example, if the corresponding data has already been calculated, the calculation completion flag represents 1. If not, the calculation completion flag represents "0". In addition, if the corresponding data has already been evacuated to the main memory 4, the swap flag represents "1". If not, the swap flag represents "0".

For example, the first entry in the data management table 34 illustrated in FIG. 15 indicates that the first data partition of the data whose data number is 62 (namely, the data partition 62-1) has already been calculated and is held on page 1 of the accelerator memory 521 of the accelerator 51. Based on the accelerator number and the page number held in an entry in the data management table 34, it is possible to refer to a matching entry in the memory management table 35 and search for information about the corresponding page used by the corresponding data. If the corresponding data needs to be used for calculation, the corresponding page can be locked.

The program analysis part 31 analyzes a DAG received from the DAG creation part 22 and representing processing created by a user and divides the DAG into data and tasks. Based on the data in the DAG, the program analysis part 31 creates entries in the data management table 34. The program analysis part 31 creates a number of entries corresponding to the number of data partitions. When the program analysis part 31 creates entries for the data, since the data partitions have not been calculated yet, the corresponding calculation completion flags in the data management table 34 represent "0".

However, entries have already been created for data that has already been outputted based on DAGs prior to the current DAG of the user program 21 as DAG input data and for data of data objects that have previously been created by another user program different from the user program 21 and that have already been stored in accelerator memories. Thus, the program analysis part 31 does not need to create new entries for these data. In addition, the calculation completion flags in these entries represent "1" in the data management table 34.

The program analysis part 31 requests the task processing part 32 to perform processing per "task" in the DAG. The program analysis part 31 requests the task processing part 32 to perform processing on subtasks based on the number of data partitions, per task in the DAG. In addition, when there is a page used in a removed entry, the program analysis part 31 resets the corresponding in-use flag in the memory management table 35 (for example, the program analysis part 31 changes the in-use flag from "1" to "0"). Consequently, the accelerator memories 521 to 523 are made available.

The data management part 33 includes a data scheduler 331 and a data movement part 332. The data scheduler 331 gives instructions for management of the data held by the accelerator memories 521 to 523 and ensuring of memories. The data movement part 332 loads data to the accelerators 51 to 53 and ensures the accelerator memories 521 to 523.

The data scheduler 331 refers to the memory management table 35 and manages the accelerator memory 521 of the accelerator 51. Likewise, the data scheduler 331 manages the other accelerators 52 and 53 in the same way. In addition, the data scheduler 331 receives a request about input data and output data necessary for execution of a subtask from the task processing part 32.

When the subtask to be executed is the first subtask in a DAG, an identifier of data object held by an accelerator memory is specified as the input data. In contrast, when the subtask to be executed is a subtask other than the first subtask, if the previous subtask in the DAG has already been completed, output data for the subtask has already been calculated. In either way, if the swap flag in the corresponding entry in the data management table 34 represents "0", since the data partition has not been evacuated to the main memory 4 yet, the preparation has already been completed on the corresponding accelerator memory.

In contrast, if the swap flag represents "1", the data scheduler 331 prepares the corresponding data partition on an accelerator memory. The data scheduler 331 refers to the memory management table 35 and determines whether any of the accelerators 51 to 53 has a page with a sufficient capacity to hold the evacuated data partition. If any of the accelerators 51 to 53 has a page with a sufficient capacity, the data scheduler 331 requests the data movement part 332 to load the evacuated data to the page with a sufficient capacity. In contrast, if none of the accelerators 51 to 53 has a page with a sufficient capacity, the data scheduler 331 refers to the data management table 34 and the memory management table 35, selects a data partition held by an unlocked page, and requests the data movement part 332 to evacuate the data partition to the main memory 4. The data scheduler 331 makes a request for the evacuation per data partition. In this way, since a memory to which the input data is loaded can be ensured, the data scheduler 331 requests the data movement part 332 to loads the data partition of the input data.

Regarding output data of a subtask, the data scheduler 331 refers to the memory management table 35. If the number of pages needed for output data of a subtask requested by the task processing part 32 can be ensured from available pages, the data scheduler 331 requests the data movement part 332 to ensure the corresponding memory. In this operation, the data scheduler 331 specifies an accelerator including the pages to be ensured.

In contrast, if the number of pages cannot be ensured from the available pages, the data scheduler 331 performs the same operation as the above operation in which a memory is ensured for loading evacuated input data. Namely, first, the data scheduler 331 requests the data movement part 332 to evacuate a data partition held on a page that is not locked on an accelerator memory to the main memory 4. Next, the data scheduler 331 causes the data movement part 332 to ensure the number of pages needed to output the output data.

In addition, the data scheduler 331 requests the data movement part 332 to lock the memory areas for the input data and the output data. In addition, the data scheduler 331 receives a processing completion notification from the task processing part 32 and requests the data movement part 332 to unlock the locked page and set the calculation completion flag of the output data in the data management table 34 to "1".

Depending on the kind of subtask requested to be executed by the task scheduler 321, there are cases in which only one of the input data and output memory area needs to be prepared. For example, in the case of a request for executing "read" for acquiring the content of a data object, no output memory area needs to be prepared.

Upon receiving an instruction from the data scheduler 331, the data movement part 332 ensures an accelerator memory or moves data to an accelerator.

Upon receiving an instruction from the data scheduler 331, the data movement part 332 ensures an accelerator memory and registers an entry for a page of the ensured memory in the memory management table 35. In addition, the data movement part 332 registers an accelerator number and a page number corresponding to the ensured memory in a data partition entry in the data management table 34.

Upon receiving an instruction from the data scheduler 331, the data movement part 332 sets the lock flag of a page being used for calculation to "1". In addition, when relevant calculation is completed for a page, the data movement part 332 resets the lock flag of the page from "1" to "0". In addition, the data movement part 332 sets the calculation completion flag for the output data to "1" in the data management table 34.

Upon receiving an instruction from the data scheduler 331, the data movement part 332 evacuates a data partition to the main memory 4. In this case, the data movement part 332 sets the swap flag for the evacuated data partition in the corresponding entry in the data management table 34. In addition, the data movement part 332 resets the in-use flag in this entry having the page used by the evacuated data partition in the memory management table 35.

The task processing part 32 includes the task scheduler 321 and a task execution part 322. The task scheduler 321 requests memory areas for input data and output data needed to execute subtasks and requests execution of the subtasks. In addition, the task execution part 322 causes the accelerators 51 to 53 to execute subtasks.

The task scheduler 321 receives a request for executing subtasks included in a DAG from the program analysis part 31. The task scheduler 321 receives a request per processing performed on an individual data partition. The task scheduler 321 sequentially executes the subtasks included in a received request, starting with the upstream subtask in the DAG. In the case of a DAG illustrated in FIG. 11, the subtask 71 corresponds to the upstream subtask. In a DAG, unless the upstream subtask is completed, the downstream (subsequent-stage) subtasks cannot be executed. The task scheduler 321 requests the data scheduler 331 to ensure memory areas for the input data and the output data needed for the individual subtask to be executed. After receiving completion of ensuring of the data and the memory areas for a subtask requested by the data scheduler 331, the task scheduler 321 notifies the task execution part 322 of the accelerator number needed to execute the corresponding subtask, the address of the input data, and the address in which the output data is to be written or information about the entries in the data management table 34 and the memory management table 35 needed to obtain the above items of information and requests the task execution part 322 to execute the subtask. This processing is performed per data partition.

When the requested subtask is "appendObject" for adding data to a data object held by an accelerator, the task scheduler 321 transmits the information to be added to the task execution part 322. This data is included in the DAG of the user program 21 that the program analysis part 31 has received.

The task scheduler 321 receives a subtask completion notification from the task execution part 322. When a subtask is completed, the task scheduler 321 requests the subtask data scheduler 331 to unlock the input data and the output data.

In addition, when the subtask that the task execution part 322 has been requested to execute is "read" for acquiring the content of a data object held in an accelerator memory, the task scheduler 321 acquires data from the task execution part 322 that has executed "read" and transmits the acquired data to the user program 21 via the program analysis part 31.

Upon receiving an instruction from the task scheduler 321, the task execution part 322 performs processing on specified input and output addresses of a specified accelerator by using a kernel function of the user program 21 received from the task scheduler 321. In addition, the task execution part 322 transmits a processing completion notification to the task scheduler 321. When the requested subtask is "appendObject", the task execution part 322 adds data to a specified data object. When the requested subtask is "read" for acquiring the content of a data object, the task execution part 322 acquires information from the corresponding address of the specified data object and notifies the task scheduler 321 of the acquired information.

Next, information held in the subtask storage part 36 and functions relating to the information among the functions of the task scheduler 321 and the data scheduler 331 will be described.

First, classification of the subtasks will be described. An individual subtask can be brought in any one of the following four states.

(1) Stand By For I/O

A state in which a subtask is waiting for the accelerator control apparatus to perform, on a memory of an accelerator that executes the subtask, preparation of an input data partition and ensuring of a memory for an output data partition (for example, a state prior to I/O in FIG. 4).

(2) Stand By For Execution

A state in which a subtask is waiting to be executed by an accelerator after an input data partition is prepared and a memory for an output data partition is ensured (for example, a state in which a subtask has been accumulated in a FIFO after I/O in FIG. 4).

(3) During Execution

A state in which a subtask is being executed by a processor on an accelerator (for example, a state indicated by "Processing" in FIG. 4).

(4) Completion of Execution

A state in which a subtask has been executed (for example, a state in which "Processing" in FIG. 4 is completed).

The preparation of an input data partition for a subtask and the ensuring of a memory for an output data partition in an accelerator will hereinafter be referred to as "preparation of I/O data for a subtask".

As illustrated in FIG. 13, the subtask storage part 36 includes an inexecutable-subtask storage part 361, an executable-subtask storage part 362, and an accelerator-based executable-subtask storage part 363.

The subtasks stored in the inexecutable-subtask storage part 361 are subtasks that cannot be candidates for which the data scheduler 331 prepares I/O data among the subtasks included in a DAG requested to be executed by the user program 21. Examples of the subtasks that cannot be candidates for which the data scheduler 331 prepares I/O data include a subtask whose upstream subtask is standing by for I/O and a case in which different accelerators include two or more subtasks standing by for execution. A subtask standing by for execution is a subtask for which the data movement part 332 has prepared I/O data in response to a request from the data scheduler 331 and for which a notification of completion of the preparation of the execution has been transmitted to the task scheduler 321 while execution of the subtask has not been started by the task execution part 322 in response to a request from the data scheduler 331 (namely, a subtask that has not been executed yet).

Figure 16A:
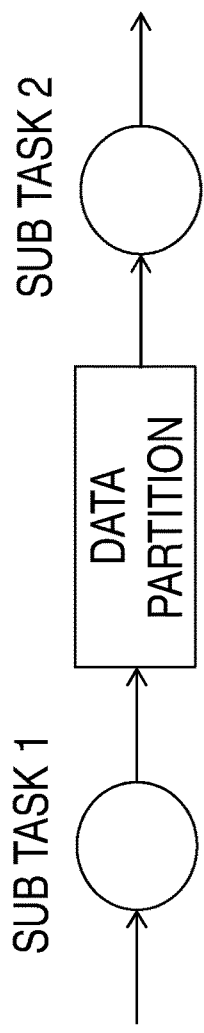
FIGS. 16A-16B illustrate examples of tasks held in an inexecutable-subtask storage part of the accelerator control apparatus according to the first exemplary embodiment.
Figure 16B:
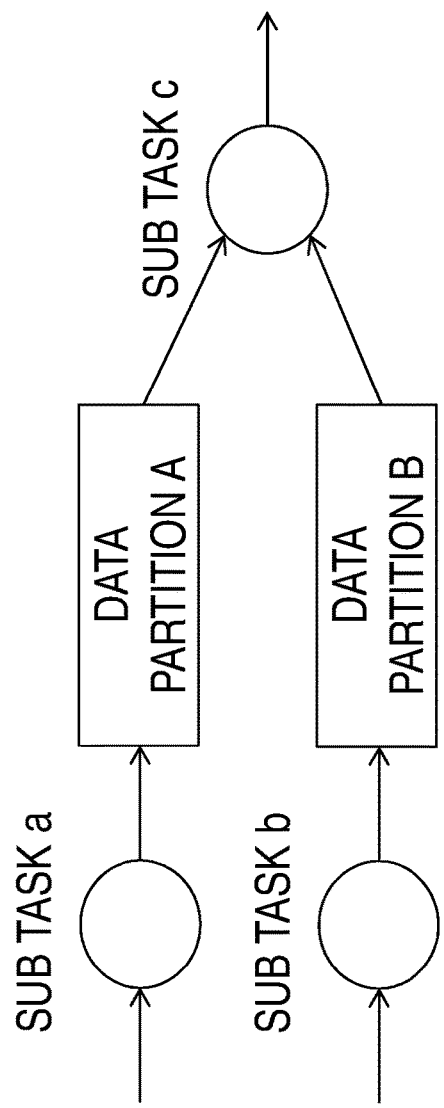

FIG. 16 illustrates examples of subtasks stored in the inexecutable-subtask storage part 361. For example, when a subtask "1" stands by for I/O in FIG. 16A, a subtask "2" is stored in the inexecutable-subtask storage part 361. In addition, when subtasks "a" and "b" stand by for execution in different accelerators in FIG. 16B, a subtask "c" is stored in the inexecutable-subtask storage part 361.

The subtasks stored in the executable-subtask storage part 362 are subtasks that can be candidates for which the data scheduler 331 prepares I/O data and that can be executed by an arbitrary unlimited accelerator in which the I/O data is prepared among the subtasks included in a DAG requested to be executed by the user program 21. A subtask that can be executed by an arbitrary unlimited accelerator in which the I/O data prepared is, for example, a most upstream subtask in a DAG, namely, there is no subtask upstream of this subtask or a subtask having all the upstream subtasks on which this subtask depends are in the state "completion of execution". In addition, the input data partition for this subtask that can be executed by an arbitrary accelerator is already held in the main memory 4 or the accelerator memory of any one of the accelerators.

The accelerator-based executable-subtask storage part 363 includes the same number of storage areas as that of accelerators. The subtasks stored in a storage area corresponding to an accelerator are those that can be candidates of the subtasks for which the data scheduler 331 prepares I/O only in this accelerator among the subtasks included in a DAG requested to be executed by the user program 21. When all the subtasks on which a subtask depends are in the state "stand by for execution" or "completion of execution", this subtask is a subtask that can be a candidate for which I/O data is prepared only in a single accelerator. In addition, at least one of the above subtasks is in the state "stand by for execution", and all these subtasks in the state "stand by for execution" are subtasks that are standing by for being executed by an accelerator corresponding to the area in which this subtask is stored.

The task scheduler 321 receives a subtask execution request from the program analysis part 31. All the subtasks requested to be executed are in the state "stand by for I/O". The task scheduler 321 stores the most upstream subtask of the subtasks in the DAG in the executable-subtask storage part 362 and stores the other subtasks in the inexecutable-subtask storage part 361. The most upstream subtask is a subtask that does not depend on any other subtasks. The task scheduler 321 notifies the data scheduler 331 that the subtask has been stored in the executable-subtask storage part 362.

In addition, the task scheduler 321 is notified by the data scheduler 331 of a subtask brought in the state "stand by for execution" after the corresponding I/O data is prepared and an identifier of an accelerator standing by for executing the subtask. Next, the task scheduler 321 requests the task execution part 322 to execute the specified subtask on the specified accelerator.

In addition, the task scheduler 321 is notified by the task execution part 322 that the subtask has been executed and brought in the state "completion of execution" and requests the data scheduler 331 to unlock the input data and the output memory area for the subtask. In addition, since the subtask has been executed, the task scheduler 321 searches for any subtasks that need to be moved from the inexecutable-subtask storage part 361 to the accelerator-based executable-subtask storage part 363 or from the accelerator-based executable-subtask storage part 363 to the executable-subtask storage part 362 and moves these subtasks accordingly. In this operation, the task scheduler 321 notifies the data scheduler 331 that the relevant subtasks have been moved to the accelerator-based executable-subtask storage part 363 and the executable-subtask storage part 362. This notification is made when a subtask has been moved to the accelerator-based executable-subtask storage part 363 and/or the executable-subtask storage part 362.

The data scheduler 331 receives a notification of the completion of the execution of a subtask from the task scheduler 321 and unlocks the I/O data partition for the subtask. When the data movement part 332 has not been requested to perform data I/O on the unlocked accelerator, the data scheduler 331 performs "I/O start processing", which will be described below.

In addition, when the data scheduler 331 is notified by the task scheduler 321 that a subtask has newly been stored in the executable-subtask storage part 362 or the accelerator-based executable-subtask storage part 363, if there are accelerators on which data I/O has not been performed by the data movement part 332, the data scheduler 331 performs the following "I/O start processing" on all of these accelerators, which will be described below.

In addition, the data scheduler 331 is notified by the data movement part 332 that I/O data has been prepared for a subtask, locks the memory areas holding the corresponding I/O data partition in the memory management table 35, brings the subtask to the state "stand by for execution", and notifies the task scheduler 321 that the subtask has been brought in the state "stand by for execution". In addition, the data scheduler 331 performs the following "I/O start processing" on the accelerator in which the I/O data for the subtask has been prepared, to perform the next I/O processing.

The data scheduler 331 requests an accelerator in which data I/O has not been performed to perform the next I/O, as the "I/O start processing". The data scheduler 331 determines I/O processing that an accelerator is requested to perform by using the prefetch determination part 334.

If the prefetch determination part 334 determines to swap out a data partition, among the data partitions held in an accelerator, the data scheduler 331 selects a data partition that is not used as an input data partition in the processing on a subtask included in a subsequent DAG and transmits an instruction for evacuating the data partition to the main memory 4 to the data movement part 332. In addition, if all the data partitions are used as input data partitions, among the data partitions used as the input partitions, the data scheduler 331 selects a data partition that has been least recently referenced and transmits an instruction for evacuating the selected data partition to the main memory 4 to the data movement part 332. The selection of the least recently referenced data partition is a management method based on an LRU (Least Recently Used) standard and is a common knowledge among the engineers in this technical field. It is necessary that the memory area holding the data partition to be evacuated be unlocked in the memory management table 35. If all the data partitions are locked, the data scheduler 331 does not perform any processing.

In contrast, when the I/O processing determined by the prefetch determination part 334 is an instruction for preparation of a data partition, the data scheduler 331 determines a subtask for which I/O data is prepared by a corresponding accelerator by using the next-subtask determination part 336. When the input data partition for the subtask determined by the next-subtask determination part 336 is stored in the accelerator memory of the corresponding accelerator, the data scheduler 331 locks the input data partition. In addition, the data scheduler 331 requests the data movement part 332 to prepare an input data partition that is not held by this accelerator and ensure an output data partition.

In addition, the data scheduler 331 receives a notification of the completion of the evacuation of the data partition to the main memory 4 from the data movement part 332 and executes I/O start processing for causing the accelerator that has completed the evacuation to perform the next data I/O.

For the data scheduler 331, the prefetch determination part 334 determines I/O processing that an accelerator is requested to perform. The prefetch determination part 334 refers to the memory management table 35 and causes the data scheduler 331 to swap out a data partition if a use amount of the accelerator memory is equal to a threshold (for example, 70% to 80% of the capacity of the accelerator memory) or more. In contrast, if the use amount of the accelerator memory is less than the threshold, the prefetch determination part 334 causes the data scheduler 331 to prepare a data partition.

The next-subtask determination part 336 specifies, for the data scheduler 331, a subtask for which the next I/O data is prepared by the specified accelerator. The next-subtask determination part 336 refers to the executable-subtask storage part 362, the accelerator-based executable-subtask storage part 363, and the data management table 34 and specifies a subtask needing the smallest data I/O on an accelerator when the I/O data is prepared as a subtask for which the next I/O data is prepared.

Specifically, the next-subtask determination part 336 selects a subtask needing the smallest data I/O on an accelerator, by searching all the areas corresponding to this accelerator in the accelerator-based executable-subtask storage part 363 and the subtasks stored in the executable-subtask storage part 362. When the subtasks are searched, regarding an input data partition, the next-subtask determination part 336 determines a data partition that is not held by a specified accelerator memory to be a data partition needing I/O and counts the corresponding data capacity in the total I/O capacity. In addition, regarding an output data partition, there are cases in which the use amount of the accelerator memory exceeds the threshold if the data capacity of the output data partition is ensured. In such cases, the next-subtask determination part 336 counts the amount of the capacity over the threshold in the total I/O capacity. This is because, when I/O data is prepared for a subtask, a data partition corresponding to the amount of the data capacity over the threshold needs to be evacuated from the accelerator. The next-subtask determination part 336 determines the total I/O capacity per subtask and selects a subtask needing the smallest data I/O as the subtask needing the smallest data I/O on an accelerator.

The data movement part 332 receives, from the data scheduler 331, a notification indicating preparation of I/O data for a subtask and specification of an accelerator in which the I/O data is prepared and prepares the I/O data. Regarding an input data partition, the data movement part 332 loads an input data partition from another accelerator or the main memory 4 holding the input data partition. In contrast, regarding an I/O data partition, the data movement part 332 ensures a memory area needed to output the data partition. In addition, regarding the I/O data partitions and the memory areas used thereby, the data movement part 332 updates related information held in the memory management table 35 and the data management table 34.

In addition, the data movement part 332 receives, from the data scheduler 331, an instruction for evacuating a data partition to the main memory 4 and evacuates the specified data partition to the main memory 4. In addition, regarding the evacuated data partition and the memory area used thereby, the data movement part 332 updates related information held in the memory management table 35 and the data management table 34.

Operation

Figure 17:
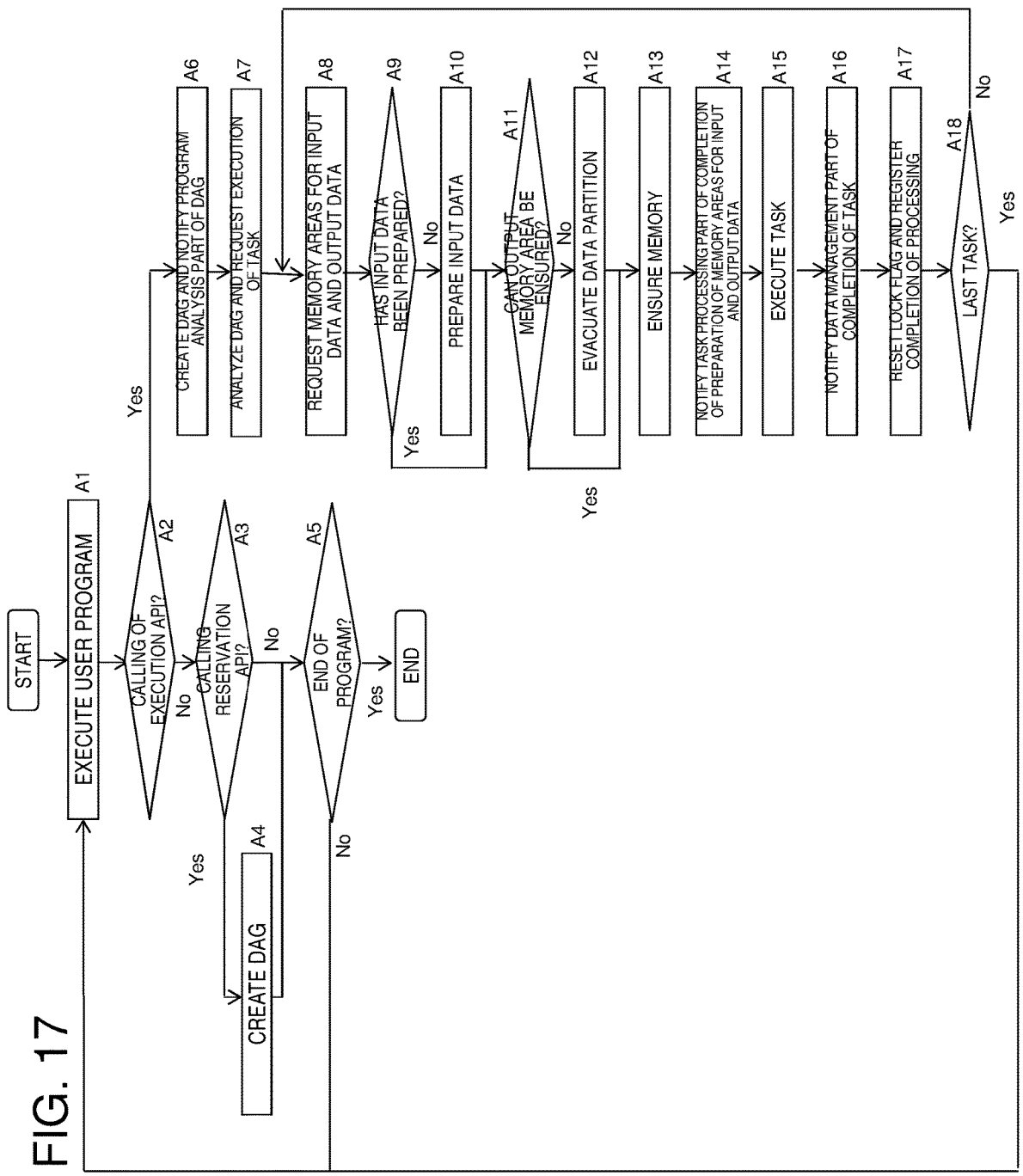
FIG. 17 is a flowchart illustrating an example of an operation of the accelerator control apparatus according to the first exemplary embodiment.

Next, an operation according to the present exemplary embodiment will be described in detail with reference to FIGS. 8, 13, and 17. FIG. 17 is a flowchart illustrating an example of an operation of the accelerator control apparatus 1 according to the present exemplary embodiment.

First, the user program 21 created by using the reservation and execution APIs is executed (step A1).

When the user program 21 calls the execution API (Yes in step A2), the DAG creation part 22 proceeds to processing for notification of a DAG that has been generated.

In contrast, if the user program 21 has not called the execution API (No in step A2), the DAG creation part 22 determines whether the reservation API has been called (step A3).

If the reservation API has been called (Yes in step A3), the DAG creation part 22 adds a task and data specified by the reservation API to a DAG that has already been generated (step A4).

Next, when the user program 21 is ended (Yes in step A5), the execution of the user program 21 is completed.

In contrast, if the user program 21 is not ended (No in step A5), the processing returns to step A1, and the execution of the user program 21 is continued.

If the execution API has been called (Yes in step A2), the DAG creation part 22 adds, if necessary, the last task and data to the DAG and notifies the program analysis part 31 of the DAG (step A6).

The program analysis part 31 receives the DAG and divides the DAG into its individual constituent tasks. Next, the program analysis part 31 requests the task processing part 32 to execute the individual subtasks (step A7). The requested execution of the subtasks is performed per data partition. For example, since the task 71 illustrated in FIG. 11 is formed by the two subtasks 71-1 and 71-2, the two individual subtasks are generated by the program analysis part 31 and the task processing part 32 is requested to execute the individual subtasks. The tasks corresponding to the respective data partitions will be referred to as subtasks or simply tasks.

The task scheduler 321 requests the data management part 33 for the memory areas for the input data and the output data needed to execute the next subtask (step A8).

The data scheduler 331 refers to the data management table 34 and determines that the data has been prepared if "1" is not set as the swap flag for the requested data (Yes in step A9). Then, the data scheduler 331 requests the data movement part 332 to set the lock flag in a corresponding entry in the memory management table 35, the entry including the memory page used by the input data.

In contrast, if "1" is set as the swap flag for the requested data (No in step A9), the task scheduler 321 refers to the memory management table 35 and determines whether there is an accelerator holding an available memory capacity sufficient for holding the data evacuated to the main memory 4. If there is such an accelerator, the data scheduler 331 requests the data movement part 332 to load the input data to the accelerator. The data movement part 332 loads the input data to the specified accelerator and updates the swap flag, the accelerator number, and the page number for the corresponding data in the data management table 34 (step A10). In addition, the data scheduler 331 refers to the memory management table 35 and updates the in-use flag, the data number, and the partition number corresponding to the page to be used by the loaded data. In addition, the data scheduler 331 sets "1" as the lock flag in the memory management table 35.

In contrast, if there is not an accelerator holding an available memory capacity sufficient for holding the data evacuated to the main memory 4, the data scheduler 331 refers to the memory management table 35 and selects data used by a page for which the lock flag is not set, and requests the data movement part 332 to evacuate the data to the main memory 4. The data movement part 332 evacuates the specified data and updates the swap flag, the accelerator number, and the page number in the data management table 34. After the data is evacuated to the main memory 4, the accelerator number and the page number corresponding to the data become invalid. The data scheduler 331 continues to request evacuation of data until a memory area needed to load the input data to an accelerator is made available. When a memory to which the input data is loaded is made available, the data is loaded. This processing is the same as that for loading the data evacuated to the main memory 4 when there is an accelerator holding an available memory capacity sufficient for holding the data.

Next, the data scheduler 331 determines whether the output memory area for the requested subtask can be ensured in the accelerator holding the input data for the subtask (step A11). If the available memory area is sufficient, the data scheduler 331 determines that the output memory area can be ensured (Yes in step A11).

However, if the available memory area is not sufficient (No in step A11), the data scheduler 331 refers to the memory management table 35 and requests the data movement part 332 to evacuate data used by a page on which the lock flag is not set. The operation of evacuating the specified data performed by the data movement part 332 (step A12) is the same as the operation of evacuating the data in step A10.

When a sufficient memory area for storing the output data is created in an accelerator, the data scheduler 331 requests the data movement part 332 to ensure the memory for the output data (step A13).

The data movement part 332 ensures the memory and writes an accelerator number and a page number corresponding to the output data in an entry in the data management table 34. In addition, the data movement part 332 sets the lock flag for the currently used page in the memory management table 35. When the memory areas are prepared for the input data and the output data on the accelerator, the data scheduler 331 notifies the task processing part 32 of the completion of the preparation of the data (step A14).

When notified of the completion of the preparation of the data, the task scheduler 321 requests the task execution part 322 to execute the subtask (step A15).

When the request for executing the subtask indicates execution of a kernel function given by the user program 21, the task execution part 322 causes the accelerator holding the data to execute the kernel function on the input data by using and to output a result to the output memory area. In contrast, when the request for executing the subtask indicates reading of data, the task execution part 322 reads the data from the accelerator holding the data and notifies the task scheduler 321 of the read data. In addition, when the request for executing the subtask indicates "append" for adding data, the task execution part 322 writes the given data in the corresponding memory area of the accelerator holding the data. When the task execution part 322 completes execution of the subtask, the task scheduler 321 notifies the data management part 33 of the completion of the subtask (step A16).

Regarding the input data and output data that has been processed, the task scheduler 321 resets the lock flag in the memory management table 35. In addition, the task scheduler 321 requests the data movement part 332 to set the calculation completion flag in the corresponding entry in the data management table 34, regarding the output data (step A17). The data movement part 332 performs the requested processing.

Until all the subtasks in the DAG requested by the program analysis part 31 are completed (No in step A18), the task scheduler 321 continues to request data for the subtasks and executes the subtasks.

In contrast, if the DAG is completed (Yes in step A18), the processing returns to step A1.

Next, of all the operations performed by the task scheduler 321 and the data scheduler 331, operations based on information held by the subtask storage part 36 will be described.

Figure 18:
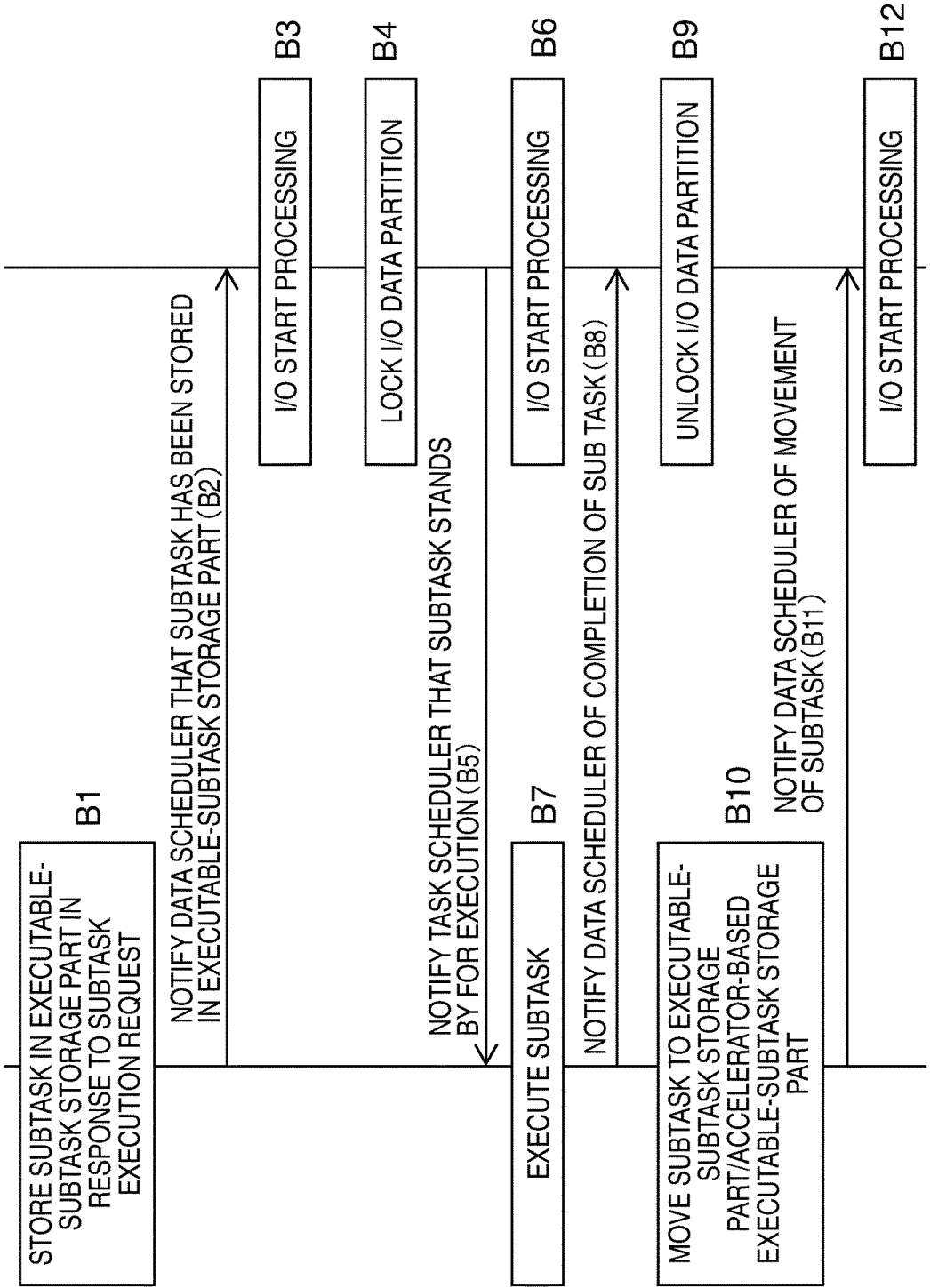
FIG. 18 is a sequence diagram illustrating an example of a detailed operation of the accelerator control apparatus according to the first exemplary embodiment.

FIG. 18 is a sequence diagram illustrating an example of a detailed operation performed by the task scheduler 321 and the data scheduler 331.

As illustrated in FIG. 18, upon reception of a subtask execution request from the program analysis part 31, the task scheduler 321 stores the most upstream subtask among the subtasks in a DAG in the executable-subtask storage part 362 and stores the other subtasks in the inexecutable-subtask storage part 361 (step B1). The task scheduler 321 notifies the data scheduler 331 that the subtask has been stored in the executable-subtask storage part 362 (step B2).

When the data scheduler 331 is notified by the task scheduler 321 that the subtask has newly been stored in the executable-subtask storage part 362 and there are any accelerators on which data I/O has not been performed by the data movement part 332, "I/O start processing" is performed on all of these accelerators (step B3).

In addition, the data scheduler 331 is notified by the data movement part 332 that the I/O data has been prepared for a subtask, locks the memory areas holding the I/O data partitions in the memory management table 35, brings the subtask in the state "stand by for execution" (step B4), and notifies the task scheduler 321 that the subtask has been brought in the state "stand by for execution" (step B5). In addition, the data scheduler 331 causes the accelerator that has completed the preparation of the I/O data for the subtask to perform "I/O start processing" for performing the next I/O processing (step B6).

The task scheduler 321 receives the subtask for which the I/O data has been prepared and which has been brought in the state "stand by for execution" and an identifier of the accelerator standing by for execution from the data scheduler 331 and requests the task execution part 322 to execute the specified subtask on the specified accelerator (step B7).

In addition, the task scheduler 321 is notified by the task execution part 322 that the subtask has been executed and brought in the state "completion of execution" and requests the data scheduler 331 to unlock the input data and the output memory area for the subtask (step B8). The data scheduler 331 is notified by the task scheduler 321 that the subtask has been executed and unlocks the I/O data partitions for the subtask (step B9).

In addition, the task scheduler 321 searches for a subtask (s) that needs to be moved from the inexecutable-subtask storage part 361 to the accelerator-based executable-subtask storage part 363 and a subtask(s) that needs to be moved from the accelerator-based executable-subtask storage part 363 to the executable-subtask storage part 362 upon completion of the execution of the subtask and moves these subtasks accordingly (step B10). In addition, the task scheduler 321 notifies the data scheduler 331 that a subtask(s) has been moved to the accelerator-based executable-subtask storage part 363 and the executable-subtask storage part 362 (step B11).

The data scheduler 331 is notified by the task scheduler 321 that the subtask(s) has newly been stored in the executable-subtask storage part 362 or the accelerator-based executable-subtask storage part 363 (step B11). If there are any accelerators on which the data movement part 332 has not performed data I/O, "I/O start processing" is performed on all of these accelerators (step B12).

Figure 19:
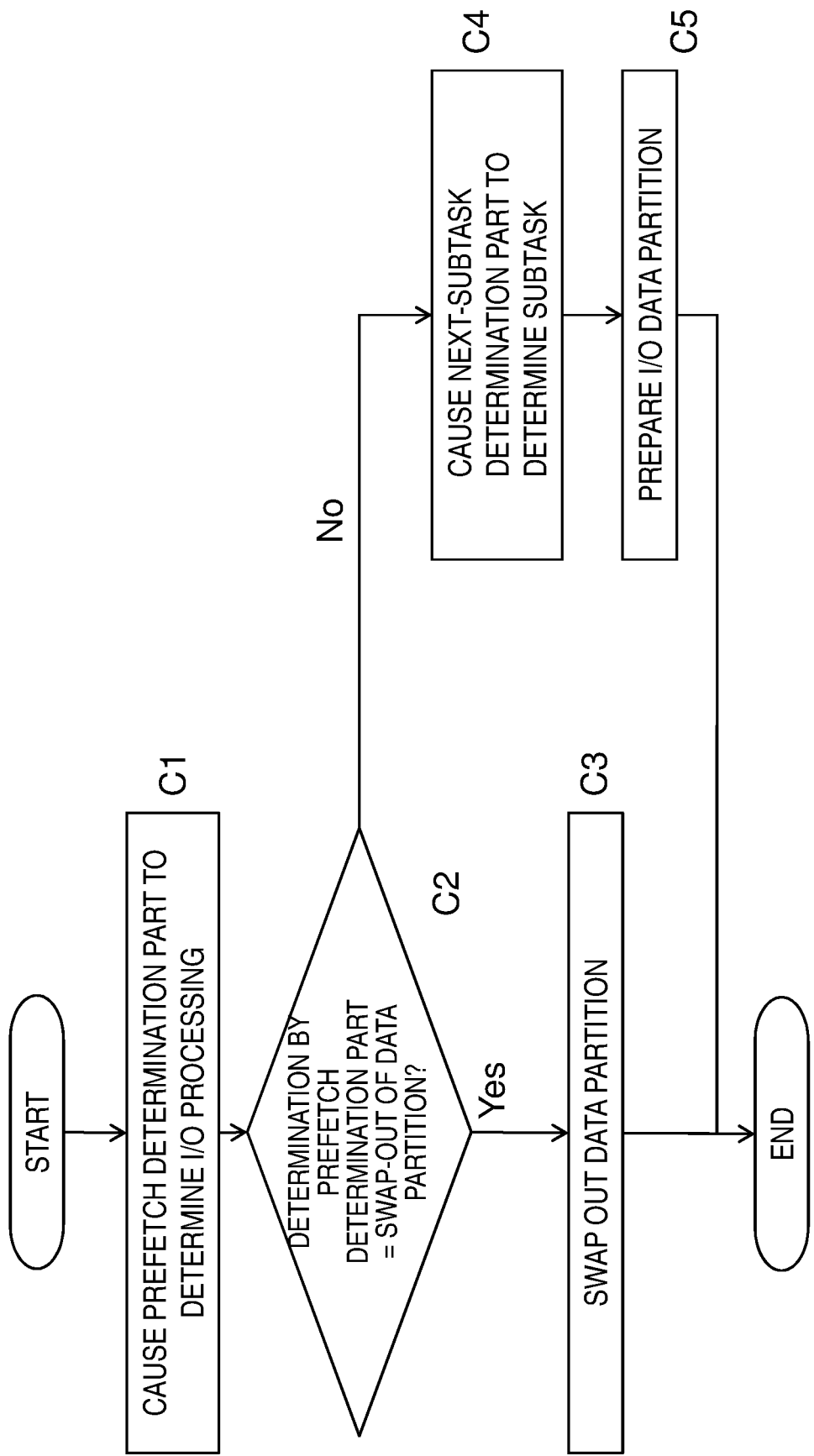
FIG. 19 is a flowchart illustrating an example of an operation of a data scheduler of the accelerator control apparatus according to the first exemplary embodiment.

FIG. 19 is a flowchart illustrating an example of the above "I/O start processing" performed by the data scheduler 331 (steps B3, B6, and B12 in FIG. 18). As illustrated in FIG. 19, the data scheduler 331 causes the prefetch determination part 334 to determine the next I/O processing performed by the accelerator (step C1).

When the prefetch determination part 334 determines to swap out a data partition (Yes in step C2), the data scheduler 331 selects a data partition that is not used as an input data partition in the processing on a subtask included in a subsequent DAG among the data partitions held in the accelerator. Alternatively, the data scheduler 331 selects the least recently referenced data partition among the data partitions used as input data partitions. In addition, the data scheduler 331 transmits an instruction for evacuating the selected data partition to the main memory 4 to the data movement part 332 (step C3).

In contrast, when the I/O processing determined by the prefetch determination part 334 is an instruction for preparation of a data partition (No in step C2), the data scheduler 331 causes the next-subtask determination part 336 to determine a subtask for which I/O data is prepared on the corresponding accelerator (step C4). In addition, when the input data partition for the subtask determined by the next-subtask determination part 336 is held by the accelerator memory of the corresponding accelerator, the data scheduler 331 locks the input data partition. The data scheduler 331 requests the data movement part 332 to prepare an input data partition that is not held by the accelerator and ensure an output data partition (step C5).

Figure 20:
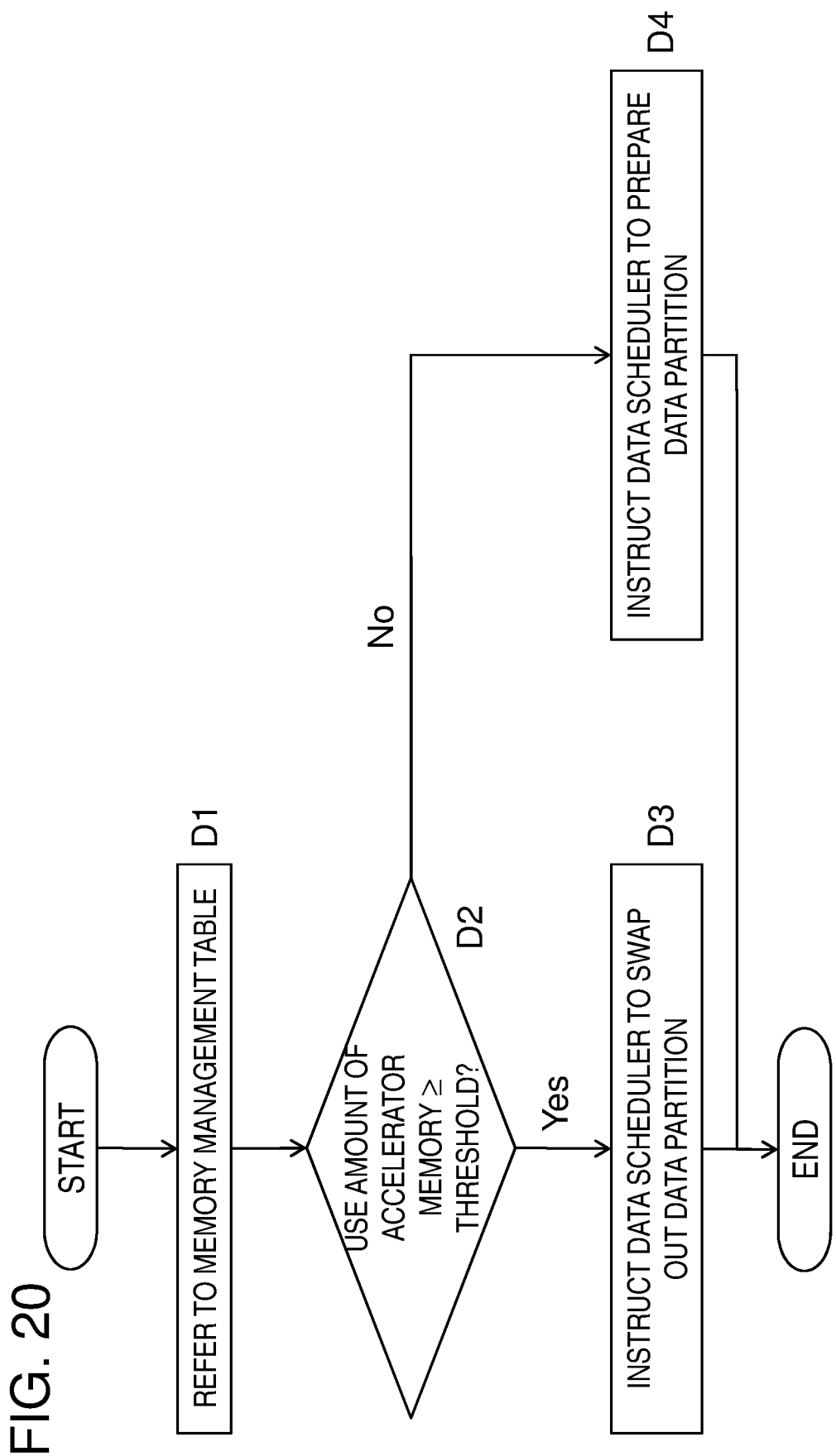
FIG. 20 is a flowchart illustrating an example of an operation of a prefetch determination part of the accelerator control apparatus according to the first exemplary embodiment.

FIG. 20 is a flowchart illustrating an example of the operation (step C1 in FIG. 19) performed by the prefetch determination part 334. As illustrated in FIG. 20, the prefetch determination part 334 refers to the memory management table 35 (step D1). If the use amount of the accelerator memory is equal to the threshold or more (Yes in step D2), the prefetch determination part 334 requests the data scheduler 331 to swap out a data partition (step D3). In contrast, if the use amount is less than the threshold (No in step D2), the prefetch determination part 334 requests the data scheduler 331 to prepare a data partition (step D4).

Figure 21:
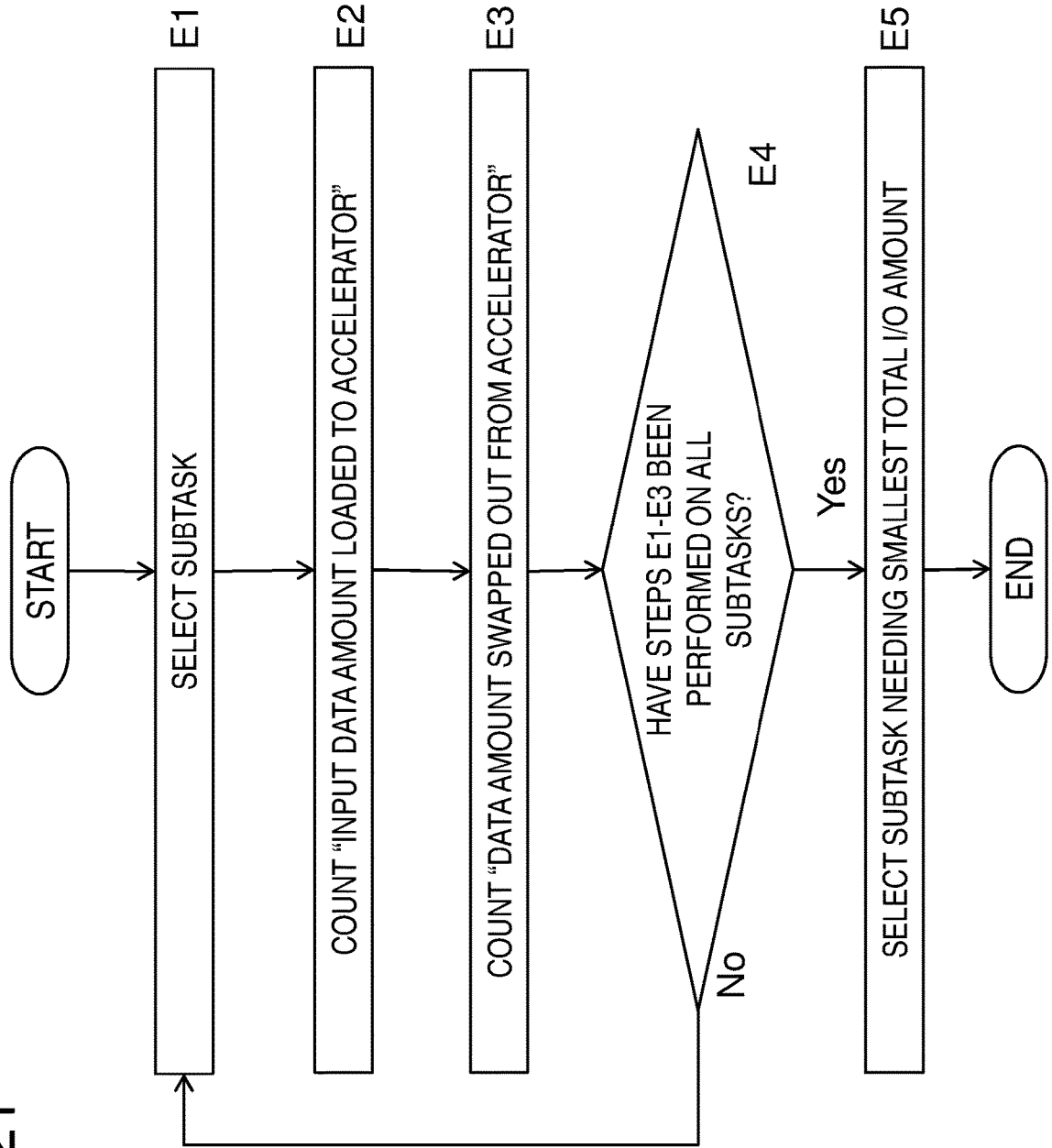
FIG. 21 is a flowchart illustrating an example of an operation of a next-subtask determination part of the accelerator control apparatus according to the first exemplary embodiment.
Figure 22:
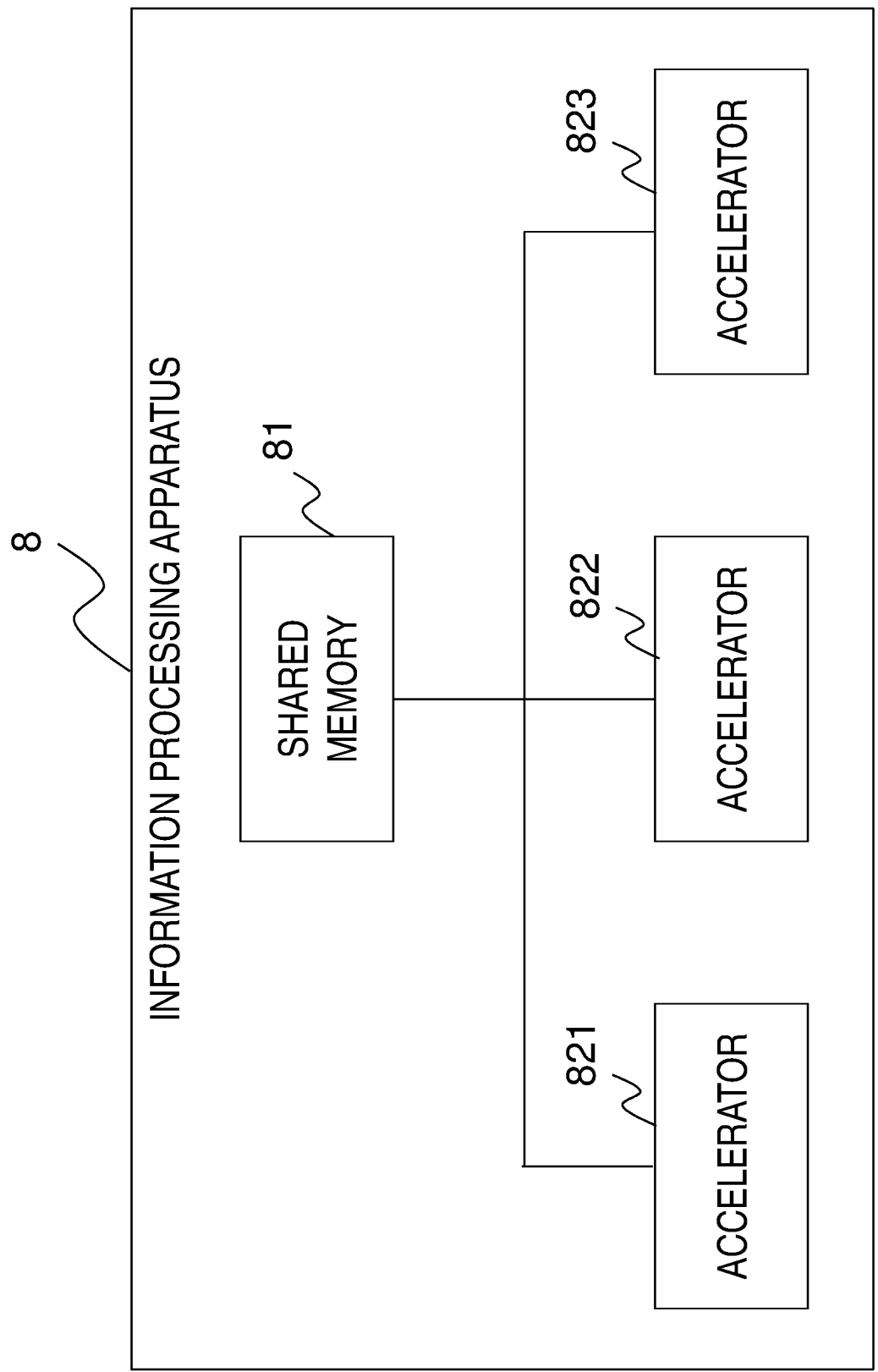
FIG. 22 illustrates a related technique disclosed in PTL 1.

FIG. 21 is a flowchart illustrating an example of the operation (step C4 in FIG. 19) performed by the next-subtask determination part 336. As illustrated in FIG. 21, the next-subtask determination part 336 searches the areas corresponding to the accelerator in the accelerator-based executable-subtask storage part 363 and the subtasks stored in the executable-subtask storage part 362 and selects a single subtask (step E1).

When the selected subtask is executed on the accelerator, the next-subtask determination part 336 calculates the total I/O amount needed on the accelerator memory. In this operation, the next-subtask determination part 336 calculates the total I/O amount from "input data amount loaded to the accelerator"+"data amount swapped out from the accelerator".

Regarding the input data partition, the next-subtask determination part 336 determines a data partition that is not held by the specified accelerator memory to be the data partition needed for I/O and counts the data amount as "the input data amount loaded to the accelerator" in the above first term (step E2).

In addition, the next-subtask determination part 336 calculates the "data amount swapped out from the accelerator" in the above second term from the "input data amount loaded as the above first term"+the "size of the area that is needed to be ensured on the accelerator memory as the output area"—the "available capacity up to the threshold of the load destination accelerator memory" (step E3). For example, when the available memory capacity up to the threshold is 1 GB, the input data that is newly loaded to the accelerator is 500 MB, and the output area ensured is 1 GB, the "data amount swapped out from the accelerator" in the above second term is 500 MB (input data loaded)+1 GB (output area ensured)−1 GB (available area)=500 MB.

When the above steps E1 to E3 are completed on the corresponding areas of the corresponding accelerator in the accelerator-based executable-subtask storage part 363 and the subtasks stored in the executable-subtask storage part 362 (Yes in step E4), the next-subtask determination part 336 selects a subtask needing the smallest total I/O amount counted as the subtask needing the smallest data I/O on the accelerator (step E5).

With the accelerator control apparatus 1 according the present exemplary embodiment, while the task scheduler 321 is executing a subtask, the data scheduler 331 selects a task(s) that needs the smallest data I/O amount on an accelerator memory as the next task and continues preparation of data I/O for the selected task. In this way, the data I/O between the accelerator memory and the main memory 4 can be reduced, and simultaneously, the I/O band between the accelerator memory and the main memory 4 can be used effectively. Thus, the accelerator control apparatus according to the present exemplary embodiment can process a task(s) using an accelerator(s) including an accelerator memory(ies) more quickly while preventing the data I/O from becoming a bottleneck.

In the present exemplary embodiment, single data is divided into a plurality of data partitions, and a plurality of accelerators are allowed to hold the data partitions. In addition, the processing of a user program is divided into a plurality of tasks, and the processing is distributed to the accelerators holding the respective data partitions. In this way, the data loading costs on the accelerators can be reduced, and the processing time can be reduced based on the number of accelerators used.

Exemplary Embodiment 2

Next, an accelerator control apparatus according to a second exemplary embodiment will be described. Since the accelerator control apparatus according to the present exemplary embodiment has the same configuration and performs the same operation as the accelerator control apparatus 1 (FIG. 8 to FIG. 21) according to the first exemplary embodiment, only the difference will be described.

In the first exemplary embodiment, when the task scheduler 321 is notified by the task execution part 322 that a subtask has been executed (step B7 in FIG. 18), the task scheduler 321 searches for a subtask(s) that needs to be moved from the inexecutable-subtask storage part 361 to the accelerator-based executable-subtask storage part 363 and a subtask(s) that needs to be moved from the accelerator-based executable-subtask storage part 363 to the executable-subtask storage part 362 upon completion of the subtask and moves the subtask(s) accordingly (step B10 in FIG. 18). In contrast, in the present exemplary embodiment, when the task scheduler 321 is notified by the data scheduler 331 that a subtask has been brought in the state "stand by for execution" (step B5 in FIG. 18), the task scheduler 321 searches a subtask(s) that needs to be moved from the inexecutable-subtask storage part 361 to the accelerator-based executable-subtask storage part 363 due to the occurrence of the subtask in the state "stand by for execution" and moves the subtask(s) accordingly. In addition, the task scheduler 321 notifies the data scheduler 331 that the subtask has been moved to the accelerator-based executable-subtask storage part 363.

In addition, instead of the task scheduler 321, the data scheduler 331 may perform the searching for and movement of the subtask(s) that needs to be moved from the inexecutable-subtask storage part 361 to the accelerator-based executable-subtask storage part 363. Namely, when a subtask in the state "stand by for execution" occurs at a timing at which an I/O data partition is locked (step B4 in FIG. 18), the data scheduler 331 may search for a subtask(s) that needs to be moved from the inexecutable-subtask storage part 361 to the accelerator-based executable-subtask storage part 363 and move the subtask(s) accordingly.

According to the present exemplary embodiment, at the timing when a subtask is brought in the state "stand by for execution" before the subtask is brought in the state "completion of execution" (see FIG. 4), the task scheduler 321 adds a downstream subtask that can become executable upon completion of this current subtask to the accelerator-based executable-subtask storage part 363. In this operation, at the timing when a task is brought in the sate "stand by for execution" before the task is brought in the state "completion of execution", the data scheduler 331 can set a downstream task that can become executable upon completion of this current task as a candidate of a task for which I/O data is prepared. Thus, according to the present exemplary embodiment, the data scheduler 331 can start to prepare I/O data for a downstream subtask at an even earlier stage, compared with the first exemplary embodiment. Thus, according to the present exemplary embodiment, the I/O (Input/Output) band between an individual accelerator memory and an external memory can be used more effectively, compared with the first exemplary embodiment. In addition, the processing of a task(s) using an accelerator(s) including a memory(ies) can be performed more quickly.

Exemplary Embodiment 3

Next, a third exemplary embodiment will be described. In the present exemplary embodiment, a computer including a CPU (Central Processing Unit) and a memory is caused to perform the operation of the accelerator control apparatus 1 according to the first or second exemplary embodiment. In particular, a CPU is used to perform the functions of the user program 21, the DAG (Directed Acyclic Graph) creation part 22, the program analysis part 31, the task scheduler 321, the task execution part 322, the data scheduler 331, and the data movement part 332. In contrast, the memory of the computer is used as the data management table 34, the memory management table 35, the subtask storage part 36, and the main memory 4. The memory is storage means in a broad sense, and examples of the memory include a semiconductor memory, a hard disk, and a flash disk generally referred to as secondary storages. In addition, an accelerator is inserted into an I/O (Input/Output) slot of the computer. Alternatively, an accelerator and the computer may be connected to each other by using an interconnection for an I/O device.

For example, the present invention can be applied to improving the speed of processing performed by a calculation apparatus(es) including an accelerator(s).

The disclosure of the above PTL is incorporated herein by reference thereto. Variations and adjustments of the exemplary embodiments are possible within the scope of the overall disclosure (including the claims) of the present invention and based on the basic technical concept of the present invention. Various combinations and selections of various disclosed elements (including the elements in the claims, exemplary embodiments, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST 1, 10 accelerator control apparatus
3 accelerator control part
4 main memory
8 information processing apparatus
11 task storage part
12 data scheduler
13 task scheduler
14 first storage part
15 second storage part
21 user program
22 DAG creation part
31 program analysis part
32 task processing part
33 data management part
34 data management table
35 memory management table
36 subtask storage part
51 to 53 accelerator
61 to 66 data
61-1 to 61-4, 62-1 to 62-4, 63-1 to 63-4 data partition
71 to 74 task
71-1 to 71-4, 72-1 to 72-4 subtask
81 shared memory
321 task scheduler
322 task execution part
331 data scheduler
332 data movement part
334 prefetch determination part
336 next-subtask determination part
361 inexecutable-subtask storage part
362 executable-subtask storage part
363 accelerator-based executable subtask storage part
511 to 513 processor
521 to 523 accelerator memory
821 to 823 accelerator

The invention claimed is:

1. An accelerator control apparatus, comprising:
a processor and a main memory storing a program causing the processor to execute processing for:
storing an executable task(s) in a storage part;
selecting, from among the executable task(s) held in the storage part, a task needing an input/output data amount on a memory included in an accelerator when the task is executed by the accelerator that is less than other tasks from among the executable task(s), and instructing the accelerator to prepare for data I/O on the memory for the selected task;
instructing the accelerator to execute the selected task and adding a task, from among tasks indicated by a request, that becomes executable upon completion of the selected task to the storage part until the tasks indicated by the request are completed; and
continuing, based on a use amount of the memory being less than a threshold, selection of a next task from the executable task(s) held in the storage part and preparation of data I/O for the next task selected.

2. The accelerator control apparatus according to claim 1, wherein the input/output data amount on a memory included in an accelerator when the task is executed by the accelerator indicates a sum of an input data amount that needs to be loaded to the memory when the task is executed on the accelerator and an output data amount that needs to be evacuated to an external memory from the memory.

3. The accelerator control apparatus according to claim 1, wherein, when a use amount of the memory is less than the threshold, the processor executes processing to continue selection of a next task and preparation of data I/O for the next task selected.

4. The accelerator control apparatus according to claim 1, wherein the storage part comprises a first storage part which holds an executable task(s) that is executable by an arbitrary unlimited accelerator and a second storage part which holds a task(s) that is executable by a limited accelerator(s), and
wherein the processor executes processing to select the task from the task(s) held in the second storage part and executable by the limited accelerator(s) and the task(s) held in the first storage part.

5. The accelerator control apparatus according to claim 4, wherein the first storage part holds a task(s), the most upstream task or all the upstream tasks of which have been executed, and
wherein the second storage part holds, as the task(s) that is executable by the limited accelerator(s), a task(s) that is at least one of the upstream tasks of which stands by for execution on the accelerator(s) and all the other remaining upstream tasks of which have been executed.

6. The accelerator control apparatus according to claim 5, wherein, when execution of the selected task is completed, the processor executes processing to update the task(s) held in the first and/or second storage part.

7. The accelerator control apparatus according to claim 5, wherein, when preparation of the data I/O for the selected task is completed, the processor executes processing to update the task(s) held in the second storage part.

8. An accelerator control method, comprising:
storing an executable task(s) a storage part;
selecting, from among the executable task(s) held in the task storage part, a task needing an input/output data amount on a memory included in an accelerator when the task is executed by the accelerator that is less than other tasks from among the executable task(s) and instructing the accelerator to prepare for data I/O on the memory for the selected task;
instructing the accelerator to execute the selected task and adding a task, from among tasks indicated by a request, that becomes executable upon completion of the selected task to the storage part until the tasks indicated by the request are completed; and
continuing, based on a use amount of the memory being less than a threshold, selection of a next task from the executable task(s) held in the storage part and preparation of data I/O for the next task selected.

9. The accelerator control method according to claim 8, wherein the input/output data amount on a memory included in an accelerator when the task is executed by the accelerator indicates a sum of an input data amount that needs to be loaded to the memory when the task is executed on the accelerator and an output data amount that needs to be evacuated to an external memory from the memory.

10. The accelerator control method according to claim 8, wherein, when a use amount of the memory is less than a predetermined threshold, selection of a next task and preparation of data I/O for the next task selected are continued.

11. The accelerator control method according to claim 8, comprising:

storing a first task(s), which is an executable task(s) that is executable by an arbitrary unlimited accelerator, in the storage part; and storing a second task(s), which is executable by a limited accelerator(s), in the storage part, wherein the task is selected from the second task(s) executable by the limited accelerator(s) and the first task(s).

12. The accelerator control method according to claim 11, wherein the first task(s) is a task(s), the most upstream task or all the upstream tasks of which have been executed, and wherein the second task(s) is a task(s) that is executable by a limited accelerator(s), at least one of the upstream tasks of which stands by for execution on the accelerator(s) and all the other remaining upstream tasks of which have been executed.

13. The accelerator control method according to claim 12, wherein, when execution of the selected task is completed, the first and/or second task(s) held in the storage part is updated.

14. The accelerator control method according to claim 11, wherein, when preparation of the data I/O for the selected task is completed, the second task(s) held in the storage part is updated.

15. A non-transitory computer-readable recording medium storing a program, causing a computer to execute processing for:

storing an executable task(s) a storage part;

selecting, from among the executable task(s) held in the task storage part, a task needing an input/output data amount on a memory included in an accelerator when the task is executed by the accelerator that is less than other tasks from among the executable task(s) and instructing the accelerator to prepare for data I/O on the memory for the selected task;

instructing the accelerator to execute the selected task and adding a task, from among tasks indicated by a request, that becomes executable upon completion of the selected task to the storage part until the tasks indicated by the request are completed; and continuing, based on a use amount of the memory being less than a threshold, selection of a next task from the executable task(s) held in the storage part and preparation of data I/O for the next task selected.

* * * * *